(12) United States Patent
Takeuchi et al.

(10) Patent No.: US 10,738,886 B2
(45) Date of Patent: Aug. 11, 2020

(54) TRANSMISSION FOR VEHICLE

(71) Applicants: TOYOTA JIDOSHA KABUSHIKI KAISHA, Toyota-shi (JP); TOYOTA MOTORSPORT GmbH, Cologne (DE)

(72) Inventors: Shinichi Takeuchi, Nisshin (JP); Akihiko Ichikawa, Toyota (JP); Junichi Muraoka, Aichi-gun (JP); Kotaro Hoshihara, Toyota (JP); Tomohiro Yoshimura, Toyota (JP); Jun Yabuta, Nagoya (JP); Klemens Pollmeier, Frechen (DE); Lars Van Leeuwen, Baarlo (NL); Andree Miller, Frechen (DE)

(73) Assignees: TOYOTA JIDOSHA KABUSHIKI KAISHA, Toyota-shi (JP); TOYOTA MOTORSPORT GmbH, Cologne (DE)

( * ) Notice: Subject to any disclaimer, the term of this patent is extended or adjusted under 35 U.S.C. 154(b) by 426 days.

(21) Appl. No.: 15/704,843

(22) Filed: Sep. 14, 2017

(65) Prior Publication Data
US 2018/0073635 A1 Mar. 15, 2018

(30) Foreign Application Priority Data
Sep. 14, 2016 (JP) .................................. 2016-179963

(51) Int. Cl.
*F16D 11/14* (2006.01)
*F16D 21/04* (2006.01)
(Continued)

(52) U.S. Cl.
CPC ............. *F16H 63/30* (2013.01); *F16D 11/14* (2013.01); *F16D 21/04* (2013.01); *F16H 3/0915* (2013.01);
(Continued)

(58) Field of Classification Search
CPC ........ F16D 11/14; F16D 21/04; F16H 3/0915; F16H 2063/3093
USPC .......................................................... 74/339
See application file for complete search history.

(56) References Cited

U.S. PATENT DOCUMENTS 2,201,169 A * 5/1940 Griswold ................. F16D 23/06
192/53.361
2,620,907 A * 12/1952 Wickberg .................. F16H 3/12
477/83

(Continued)

FOREIGN PATENT DOCUMENTS

JP 49-41762 A 4/1974
JP 2006-525479 A 11/2006
(Continued)

*Primary Examiner* — Ha Dinh Ho
(74) *Attorney, Agent, or Firm* — Oblon, McClelland, Maier & Neustadt, L.L.P.

(57) ABSTRACT

A first dog ring and a second dog ring are biased toward each other by means of springs. When the first dog ring and the second dog ring are moved away from each other, bias force produced by the springs is applied to the second dog ring in a direction to draw the second dog ring toward the first dog ring. Accordingly, when the first dog ring is moved away from the second dog ring during shifting, the second dog ring is drawn toward the first dog ring under the bias force, and third engaging teeth of the second dog ring and meshing teeth of a first-speed gear are promptly disengaged from each other.

7 Claims, 12 Drawing Sheets

(51) Int. Cl.
*F16H 3/091* (2006.01)
*F16H 63/30* (2006.01)
*F16H 63/18* (2006.01)
*F16H 3/08* (2006.01)

(52) U.S. Cl.
CPC ...... *F16H 63/18* (2013.01); *F16H 2003/0811* (2013.01); *F16H 2063/3093* (2013.01); *F16H 2200/0052* (2013.01)

(56) References Cited

U.S. PATENT DOCUMENTS

| | | | |
|---|---|---|---|
| 3,478,851 A * | 11/1969 | Smyth | F16H 3/12 |
| | | | 192/3.55 |
| 3,872,737 A | 3/1975 | Thomas | |
| 4,096,932 A * | 6/1978 | Liberty, Jr. | F16D 11/10 |
| | | | 192/48.91 |
| 5,827,148 A * | 10/1998 | Seto | B60W 10/10 |
| | | | 477/15 |
| 8,171,814 B2 * | 5/2012 | Martin | B60W 10/02 |
| | | | 74/342 |
| 9,267,550 B2 * | 2/2016 | Nakamura | F16D 11/00 |
| 2006/0207362 A1 | 9/2006 | Martin | |
| 2017/0051811 A1 | 2/2017 | Takeuchi et al. | |

FOREIGN PATENT DOCUMENTS

| | | | |
|---|---|---|---|
| JP | 5707119 B2 | 4/2015 | |
| JP | 2017-40333 A | 2/2017 | |

\* cited by examiner

TRANSMISSION FOR VEHICLE

INCORPORATION BY REFERENCE

The disclosure of Japanese Patent Application No. 2016-179963 filed on Sep. 14, 2016 including the specification, drawings and abstract is incorporated herein by reference in its entirety.

BACKGROUND

1. Technical Field

The disclosure relates to a transmission provided in a vehicle, and is particularly concerned with the structure of the transmission that can curb or prevent interruption of torque transmission during shifting.

2. Description of Related Art

A transmission provided in a vehicle, which has a structure capable of curbing or preventing interruption of torque transmission during shifting, has been proposed. One example of the transmission is described in Japanese Patent No. 5707119. In the transmission disclosed in Japanese Patent No. 5707119, a plurality of clutch rings, and a plurality of shift gears that mesh with the clutch rings, are disposed on the same axis, and, at the time of a gearshift, an apply-side shift gear is engaged with the corresponding clutch ring, and a release-side shift gear is disengaged from the corresponding clutch ring at the same time, so that interruption of torque transmission during the gearshift is curbed or prevented. More specifically, guide portions each consisting of a cam groove and a cam protrusion are provided between the clutch ring and a driving force transmission shaft. When a higher-speed shift gear and a lower-speed shift gear are simultaneously engaged with the clutch rings at the same time, during an upshift or a downshift, slopes provided in the cam grooves cause thrust force to be generated in a disengaging or releasing direction and applied to the release-side clutch ring.

SUMMARY

In the transmission described in Japanese Patent No. 5707119, inclined faces are provided on engaging teeth (clutch teeth) of the clutch ring, and meshing teeth of the shift gear are moved along the inclined faces, so that the engaging teeth can be easily disengaged. In this arrangement, it takes time for the meshing teeth of the shift gear to move along the inclined faces, the engaging teeth may not be promptly disengaged from the meshing teeth. Also, since the inertia is different for each gear position, the engaging teeth may be less likely to be disengaged, depending on the angle of the inclination. In view of this possibility, it may be considered to change the angle of the inclination for each gear position, but the manufacturing cost would be increased.

This disclosure has been developed on the background of the above situation, and provides a transmission that can curb or prevent interruption of torque transmission during shifting, which transmission has a structure that can surely release meshing engagement between engaging teeth of a clutch and meshing teeth of a shift gear, which are to be disengaged during shifting.

According to one aspect of the disclosure, a vehicular transmission including a shaft, a plurality of shift gears, a changeover mechanism, and a shift mechanism is provided. The shift gears are fitted on the shaft such that the shift gears are rotatable relative to the shaft. The changeover mechanism is located adjacent to the shift gears in an axial direction of the shaft. The changeover mechanism is configured to switch between a condition where a selected one of the shift gears and the shaft rotate as a unit, and a condition where the shift gear and the shaft rotate relative to each other. The shift mechanism is configured to apply force to the changeover mechanism in the axial direction of the shaft. The changeover mechanism is operable to change a gear position of the vehicular transmission. Each of the shift gears includes a plurality of meshing teeth provided on a surface of the shift gear which faces the changeover mechanism in the axial direction of the shaft such that the meshing teeth protrude from the surface. The changeover mechanism includes a first ring and a second ring. The first ring is fitted on the shaft such that the first ring is not rotatable relative to the shaft, and is movable relative to the shaft in the axial direction of the shaft. The second ring is fitted on the shaft such that the second ring is not rotatable relative to the shaft, and is movable relative to the shaft in the axial direction of the shaft. At least one of the first ring and the second ring includes first engaging teeth that mesh with the meshing teeth of one of the shift gears. The changeover mechanism further includes a plurality of springs. The springs are configured to bias the first ring and the second ring toward each other. The springs are configured to be elastically deformed when the first ring and the second ring move away from each other in the axial direction of the shaft.

According to the vehicular transmission as described above, the springs are provided for biasing the first ring and the second ring toward each other. Therefore, when one of the rings is moved away from the other ring, the springs are elastically deformed, so that bias force produced by the springs is applied to the other ring in such a direction that the other ring comes closer to the one ring. Accordingly, if the one ring is moved away from the other ring during shifting, in a condition where the first engaging teeth of the other ring are in meshing engagement with the meshing gear of the shift gear, the bias force is applied to the other ring. Then, if force due to friction between the first engaging teeth of the other ring and the meshing teeth of the shift gear becomes smaller than the bias force, the other ring is drawn toward the one ring due to the bias force, and the first engaging teeth of the other ring and the meshing teeth of the shift gear are promptly disengaged from each other. Thus, the first engaging teeth of the ring and the meshing teeth of the shift gear can be surely disengaged from each other, owing to the bias force of the springs.

In the vehicular transmission as described above, at least one of the first ring and the second ring may include second engaging teeth that protrude toward the other ring of the first ring and the second ring. The second engaging teeth may pass through through-holes provided in the other ring, and may be arranged to be able to mesh with the meshing teeth of one of the shift gears which faces the other ring. The springs may be configured to be elastically deformed, when the first ring and the second ring are moved toward the above-indicated one of the shift gears, and the second engaging teeth contact with the meshing teeth of the shift gear.

According to the vehicular transmission as described above, the second engaging teeth pass through the through-holes provided in the other ring. If the second engaging teeth collide with the meshing teeth of the shift gear, when the first ring and the second ring are moved toward the shift gear, the springs are elastically deformed, so that shock due to the collision can be reduced. Also, even if the second engaging teeth contact with the meshing teeth during movement of the first ring and the second ring, the second engaging teeth are pushed away by the meshing teeth, and movement of the other ring is not restricted; therefore, the meshing teeth can easily mesh with the first engaging teeth and the second engaging teeth. After meshing engagement, the springs cause the second engaging teeth to return to the original positions. Accordingly, after meshing engagement, the range in which each meshing tooth can move is limited between the first engaging tooth and the second engaging tooth, and backlash between the meshing tooth, and the first and second engaging teeth, as measured in the rotational direction is reduced.

In the vehicular transmission as described above, the second engaging teeth may be located adjacent to the first engaging teeth in a circumferential direction, and the second engaging teeth may be located ahead of the first engaging teeth as viewed in a rotational direction during forward traveling.

According to the vehicular transmission as described above, the second engaging teeth are located ahead of the first engaging teeth as viewed in the rotational direction during forward traveling. Therefore, during driving, the meshing teeth are brought into meshing engagement of the first engaging teeth. Accordingly, even if the ring on which the second engaging teeth are provided is moved away from the shift gear, meshing engagement between the first engaging teeth provided on the other ring and the meshing teeth is maintained.

In the vehicular transmission as described above, the springs may be elastically deformed in advance in a condition where the first ring and the second ring are located adjacent to each other.

According to the vehicular transmission as described above, the springs are elastically deformed in advance, in the condition where the first ring and the second ring are located adjacent to each other. Thus, even in the condition where the first ring and the second ring are located adjacent to each other, bias force that draws or pulls these rings together can be generated.

In the vehicular transmission as described above, the springs may be arranged equiangularly in a circumferential direction of the first ring and the second ring.

According to the vehicular transmission as described above, the springs are arranged equiangularly in the circumferential direction of the first ring and the second ring. Therefore, the bias force applied between the first ring and the second ring can be equally provided in the rotational direction.

In the vehicular transmission as described above, the first engaging teeth that protrude from one of the first ring and the second ring which is located adjacent to the shift gear, toward the shift gear, may be provided with inclined faces.

According to the vehicular transmission as described above, the first engaging teeth that protrude from one of the first ring and the second ring which is located adjacent to the shift gear, toward the shift gear, are provided with the inclined faces. Therefore, if the meshing teeth contact with the inclined faces when the shift gear and the ring rotate relative to each other, the meshing teeth are pushed out by the inclined faces, so that the meshing teeth and the first engaging teeth can be surely disengaged from each other.

In the vehicular transmission as described above, the magnitude of bias force of the springs may be set such that meshing engagement between the first engaging teeth of one ring of the first ring and the second ring and the meshing teeth of a corresponding one of the shift gears is maintained, when the other ring moves away from the one ring, in a condition where power is transmitted between the one ring and the corresponding shift gear, with the first engaging teeth of the one ring meshing with the meshing teeth of the shift gear.

According to the vehicular transmission as described above, the magnitude of bias force of the spring is set in the manner as described above. Therefore, even if the other ring moves away from the one ring, meshing engagement between the first engaging teeth of the one ring and the meshing teeth can be maintained. When power stops being transmitted between the first engaging teeth of the one ring and the meshing teeth, the one ring is drawn toward the other ring under the bias force of the spring, and the first engaging teeth and the meshing teeth are promptly disengaged from each other.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
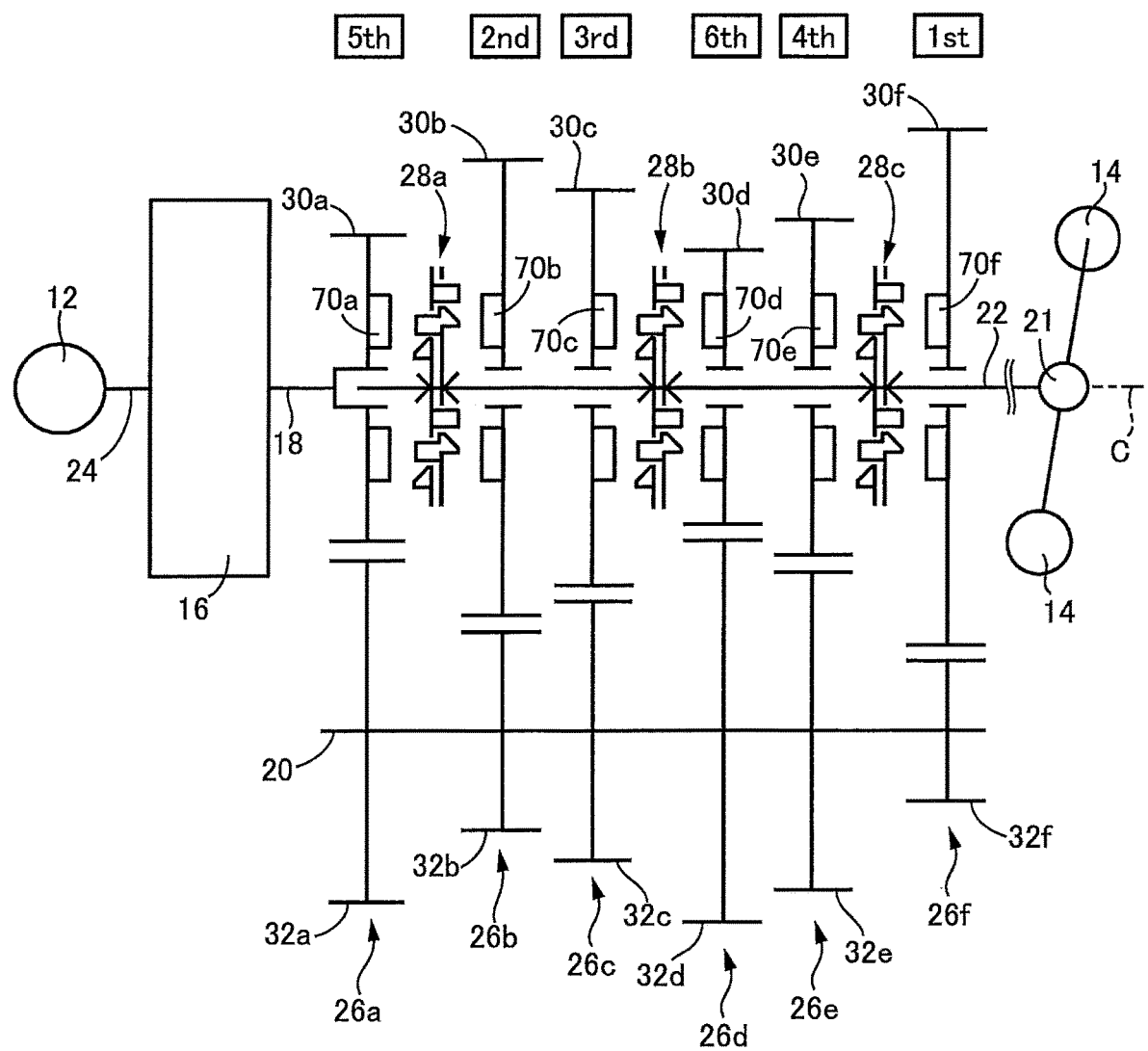
FIG. 1 is a skeleton diagram simply showing the structure of a vehicular transmission according to first and second embodiments of the disclosure.

Some embodiments of the disclosure will be described in detail with reference to the drawings. In the following embodiments, parts or components are simplified or modified as needed in the drawings, and the ratio of dimensions, shape, etc. of each part or component are not necessarily depicted with accuracy.

FIG. 1 is a skeleton diagram simply showing the structure of a vehicular transmission 10 (which will be called "transmission 10") as the embodiments of the disclosure. The transmission 10 is a parallel two-rod type transmission provided on a power transmission path between an engine 12 and drive wheels 14. In operation, the transmission 10 increases or reduces the speed of rotation received from the engine 12 at given gear ratios or speed ratios γ, so as to establish a plurality of gear positions (speeds).

The transmission 10 includes an input shaft 18 coupled to the engine 12 via a clutch 16 such that power can be transmitted therebetween, a countershaft 20 disposed in parallel with the input shaft 18, and an output shaft 22 coupled to the drive wheels 14 via a differential mechanism 21, etc. such that power can be transmitted therebetween. The input shaft 18 and the output shaft 22 are disposed on the same axis C as that of a crankshaft 24 of the engine 12. The output shaft 22 is one example of the shaft of the disclosure.

The transmission 10 includes a first pair of gears 26a, second pair of gears 26b, third pair of gears 26c, fourth pair of gears 26d, fifth pair of gears 26e, and a sixth pair of gears 26f, which are arranged in this order from the engine 12 toward the drive wheels 14 in the direction of the axis C. In the following description, the first pair of gears 26a through the sixth pair of gears 26f will be simply referred to as "pair of gears 26" when they are not distinguished. The transmission 10 also includes a first changeover mechanism 28a located between the first pair of gears 26a and the second pair of gears 26b in the direction of the axis C, a second changeover mechanism 28b located between the third pair of gears 26c and the fourth pair of gears 26d in the direction of the axis C, and a third changeover mechanism 28c located between the fifth pair of gears 26e and the sixth pair of gears 26f in the direction of the axis C. The first, second, and third changeover mechanisms 28a, 28b, 28c are disposed on the output shaft 22. In the following description, the first changeover mechanism 28a through the third changeover mechanism 28c will be simply referred to as "changeover mechanism 28" when they are not distinguished. Each of the first changeover mechanism 28a through the third changeover mechanism 28c is one example of the changeover mechanism of the disclosure.

The first pair of gears 26a consists of an input gear 30a, and a counter gear 32a that meshes with the input gear 30a. The input gear 30a is connected to the input shaft 18, and is also relatively rotatably fitted on the output shaft 22, such that rotation of the engine 12 is transmitted to the input gear 30a via the clutch 16. The counter gear 32a is provided integrally on the countershaft 20. Accordingly, when the input gear 30a rotates, the rotation is transmitted to the counter gear 32a so that the countershaft 20 is rotated. The input gear 30a is provided with meshing teeth 70a that can mesh with engaging teeth (which will be described later) of the first changeover mechanism 28a. The input gear 30a is one example of the shift gear of the disclosure.

The second pair of gears 26b consists of a second-speed gear 30b, and a second-speed counter gear 32b that meshes with the second-speed gear 30b. The second-speed gear 30b is relatively rotatably fitted on an outer circumferential surface of the output shaft 22. The second-speed counter gear 32b is integrally (relatively non-rotatably) fixed to the countershaft 20. When the second-speed gear 30b is switched into a condition (relatively non-rotatable condition) where the gear 30b rotates as a unit with the output shaft 22, by means of the first changeover mechanism 28a, the countershaft 20 and the output shaft 22 are coupled to each other via the second pair of gears 26b such that power can be transmitted between the shafts 20, 22. At this time, a second-speed gear position 2nd is established in the transmission 10. The second-speed gear 30b is provided with meshing teeth 70b that can mesh with engaging teeth (which will be described later) of the first changeover mechanism 28a. The second-speed gear 30b is one example of the shift gear of the disclosure.

The third pair of gears 26c consists of a third-speed gear 30c, and a third-speed counter gear 32c that meshes with the third-speed gear 30c. The third-speed gear 30c is relatively rotatably fitted on the outer circumferential surface of the output shaft 22. The third-speed counter gear 32c is integrally (relatively non-rotatably) fixed to the countershaft 20. When the third-speed gear 30c is switched into a condition (relatively non-rotatable condition) where the gear 30c rotates as a unit with the output shaft 22, by means of the second changeover mechanism 28b, the countershaft 20 and the output shaft 22 are coupled to each other via the third pair of gears 26c such that power can be transmitted between the shafts 20, 22. At this time, a third-speed gear position 3rd is established in the transmission 10. The third-speed gear 30c is provided with meshing teeth 70c that can mesh with engaging teeth (which will be described later) of the second changeover mechanism 28b. The third-speed gear 30c is one example of the shift gear of the disclosure.

The fourth pair of gears 26d consists of a sixth-speed gear 30d, and a sixth-speed counter gear 32d that meshes with the sixth-speed gear 30d. The sixth-speed gear 30d is relatively rotatably fitted on the outer circumferential surface of the output shaft 22. The sixth-speed counter gear 32d is integrally (relatively non-rotatably) fixed to the countershaft 20. When the sixth-speed gear 30d is switched into a condition (relatively non-rotatable condition) where the gear 30d rotates as a unit with the output shaft 22, by means of the second changeover mechanism 28b, the countershaft 20 and the output shaft 22 are coupled to each other via the fourth pair of gears 26d such that power can be transmitted between the shafts 20, 22. At this time, a sixth-speed gear position 6th is established in the transmission 10. The sixth-speed gear 30d is provided with meshing teeth 70d that can mesh with engaging teeth (which will be described later) of the second changeover mechanism 28b. The sixth-speed gear 30d is one example of the shift gear of the disclosure.

The fifth pair of gears 26e consists of a fourth-speed gear 30e, and a fourth-speed counter gear 32e that meshes with the fourth-speed gear 30e. The fourth-speed gear 30e is relatively rotatably fitted on the outer circumferential surface of the output shaft 22. The fourth-speed counter gear 32e is integrally (relatively non-rotatably) fixed to the countershaft 20. When the fourth-speed gear 30e is switched into a condition (relatively non-rotatable condition) where the gear 30e rotates as a unit with the output shaft 22, by means of the third changeover mechanism 28c, the countershaft 20 and the output shaft 22 are coupled to each other via the fifth pair of gears 26e such that power can be transmitted between the shafts 20, 22. At this time, a fourth-speed gear position 4th is established in the transmission 10. The fourth-speed gear 30e is provided with meshing teeth 70e that can mesh with engaging teeth (which will be described later) of the third changeover mechanism 28c. The fourth-speed gear 30e is one example of the shift gear of the disclosure.

The sixth pair of gears 26f consists of a first-speed gear 30f, and a first-speed counter gear 32f that meshes with the first-speed gear 30f. The first-speed gear 30f is relatively rotatably fitted on (to) the outer circumferential surface of the output shaft 22. If the first-speed gear 30f is switched (changed) into a condition (relatively non-rotatable condition) where it (the gear 30f) rotates as a unit (integrally) with the output shaft 22 by (means of) the third changeover mechanism 28c, the countershaft 20 and the output shaft 22 are coupled to each other via the sixth pair of gears 26f such that power can be transmitted between the shafts 20, 22. At this time, a first-speed gear position 1st is established in the transmission 10. The first-speed gear 30f is provided with meshing teeth 70f that can mesh with engaging teeth (which will be described later) of the third changeover mechanism 28c. The first-speed gear 30f is one example of the shift gear of the disclosure.

The first changeover mechanism 28a is a clutch (connecting and disconnecting mechanism) that is located adjacent to the input gear 30a and the second-speed gear 30b in the direction of the axis C, and selectively connects or disconnects the output shaft 22 to or from the input gear 30a or the second-speed gear 30b. More specifically, the first changeover mechanism 28a is configured to be able to switch the transmission 10 between a condition where the input gear 30a or the second-speed gear 30b rotates as a unit with the output shaft 22 (a condition where the input gear 30a or the second-speed gear 30b is relatively non-rotatably coupled to the output shaft 22), and a condition where the input gear 30a and the second-speed gear 30b rotate relative to the output shaft 22. When the transmission 10 is switched into a condition where the input gear 30a and the output shaft 22 rotate as a unit, the input shaft 18 and the output shaft 22 are directly coupled to each other, and the fifth-speed gear position 5th in which the speed ratio γ is equal to 1.0 is established. When the transmission 10 is switched into a condition where the second-speed gear 30b and the output shaft 22 rotate as a unit, the second-speed gear position 2nd is established.

The second changeover mechanism 28b is a clutch (connecting and disconnecting mechanism) that is located adjacent to the third-speed gear 30c and the sixth-speed gear 30d in the direction of the axis C, and selectively connects or disconnects the output shaft 22 to or from the third-speed gear 30c or the sixth-speed gear 30d. More specifically, the second changeover mechanism 28b is configured to be able to switch the transmission 10 between a condition where the third-speed gear 30c or the sixth-speed gear 30d rotates as a unit with the output shaft 22 (a condition where the third-speed gear 30c or the sixth-speed gear 30d is relatively non-rotatably coupled to the output shaft 22), and a condition where the third-speed gear 30c and the sixth-speed gear 30d rotate relative to the output shaft 22. When the transmission 10 is switched into a condition where the third-speed gear 30c and the output shaft 22 rotate as a unit, the third-speed gear position 3rd is established. When the transmission 10 is switched into a condition where the sixth-speed gear 30d and the output shaft 22 rotate as a unit, the sixth-speed gear position 6th is established.

The third changeover mechanism 28c is a clutch (connecting and disconnecting mechanism) that is located adjacent to the fourth-speed gear 30e and the first-speed gear 30f in the direction of the axis C, and selectively connects or disconnects the output shaft 22 to or from the fourth-speed gear 30e or the first-speed gear 30f. More specifically, the third changeover mechanism 28c is configured to be able to switch the transmission 10 between a condition where the fourth-speed gear 30e or the first-speed gear 30f rotates as a unit with the output shaft 22 (a condition where the fourth-speed gear 30e or the first-speed gear 30f is relatively non-rotatably coupled to the output shaft 22), and a condition where the fourth-speed gear 30e and the first-speed gear 30f rotate relative to the output shaft 22. When the transmission 10 is switched into a condition where the fourth-speed gear 30e and the output shaft 22 rotate as a unit, the fourth-speed gear position 4th is established. When the transmission 10 is switched into a condition where the first-speed gear 30f and the output shaft 22 rotate as a unit, the first-speed gear position 1st is established. Thus, it is possible to shift the transmission 10 among forward six-speed gear positions, by switching operating states of the first changeover mechanism 28a to the third changeover mechanism 28c.

Figure 2:
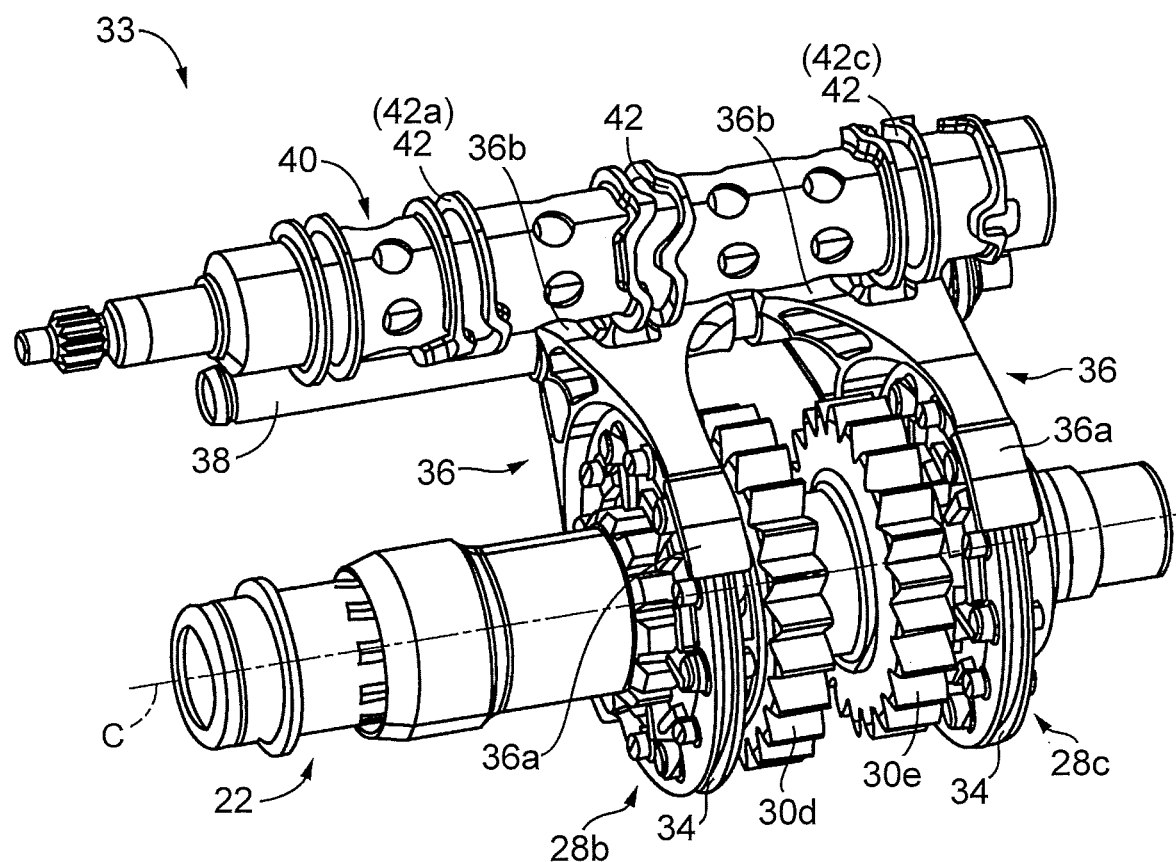
FIG. 2 is a perspective view generally showing a shift mechanism that applies shift operation force for shifting the transmission to each gear position, to each changeover mechanism, in the transmission shown in FIG. 1.

FIG. 2 is a perspective view generally showing a shift mechanism 33 that provides each changeover mechanism 28 with shift operation force required to shift the transmission 10 of FIG. 1 to each gear position. In FIG. 2, the second changeover mechanism 28b and the third changeover mechanism 28c are illustrated, but the first changeover mechanism 28a is not illustrated. Further, the third-speed gear 30c located adjacent to the second changeover mechanism 28b, and the first-speed gear 30f located adjacent to the third changeover mechanism 28c are also not illustrated.

The shift mechanism 33 includes shift forks 36 each fitted on each changeover mechanism 28, a holding shaft 38 that holds the shift forks 36, and a shift shaft 40. The holding shaft 38 and the shift shaft 40 are disposed in parallel with the axis C of the output shaft 22.

The second changeover mechanism 28b will be described by way of example. An annular groove 34 is provided in an outer peripheral portion of the second changeover mechanism 28b, and a corresponding one of the shift forks 36 is fitted in the groove 34.

The shift fork 36 consists of a fit portion 36a that is provided in a forked or bifurcated form and fitted in the groove 34, and a supported portion 36b that is held by the holding shaft 38. The supported portion 36b of the shift fork 36 is fitted on the holding shaft 38 such that the supported portion 36b can move relative to the holding shaft 38 in the axial direction. With this arrangement, the shift fork 36, which is held by the holding shaft 38, is allowed to move in the direction of the axis C.

Also, a protrusion (not shown) is provided on the supported portion 36b of the shift fork 36, and the protrusion is engaged with a shift groove 42 provided on the shift shaft 40. A portion of the shift groove 42 in the circumferential direction of the shift shaft 40 is bent or curved. When the shift shaft 40 rotates, and the protrusion is brought into contact with the bent portion, the protrusion is caused to move in the direction of the axis C according to the shape of the shift groove 42. As a result, the shift fork 36 is moved, along with the protrusion, in the direction of the axis C. When the shift fork 36 is moved in the direction of the axis C, force is applied to the second changeover mechanism 28b, via the shift fork 36 and the groove 34, so as to move the second changeover mechanism 28b in the direction of the axis C. Namely, shift operation force required to switch or change the operating state of the second changeover mechanism 28b is applied to the second changeover mechanism 28b.

Although not described in detail, the first changeover mechanism 28a and the third changeover mechanism 28c are similarly configured such that, as the shift shaft 40 rotates, force is applied from the shift fork 36 to each changeover mechanism 28, via the shift groove 42 and the protrusion, so as to move the changeover mechanism 28 in the direction of the axis C. The shift grooves 42 that are provided on the shift shaft 40 and engaged with the protrusions of the corresponding changeover mechanisms 28 have bent portions that are provided at different positions in the circumferential direction. More specifically, each of the shift grooves 42 is shaped such that the transmission 10 is shifted successively in the order of the first-speed gear position 1st to the sixth-speed gear position 6th, as the shift shaft 40 rotates. The operation of each changeover mechanism 28 during a gearshift will be described later.

Figure 3:
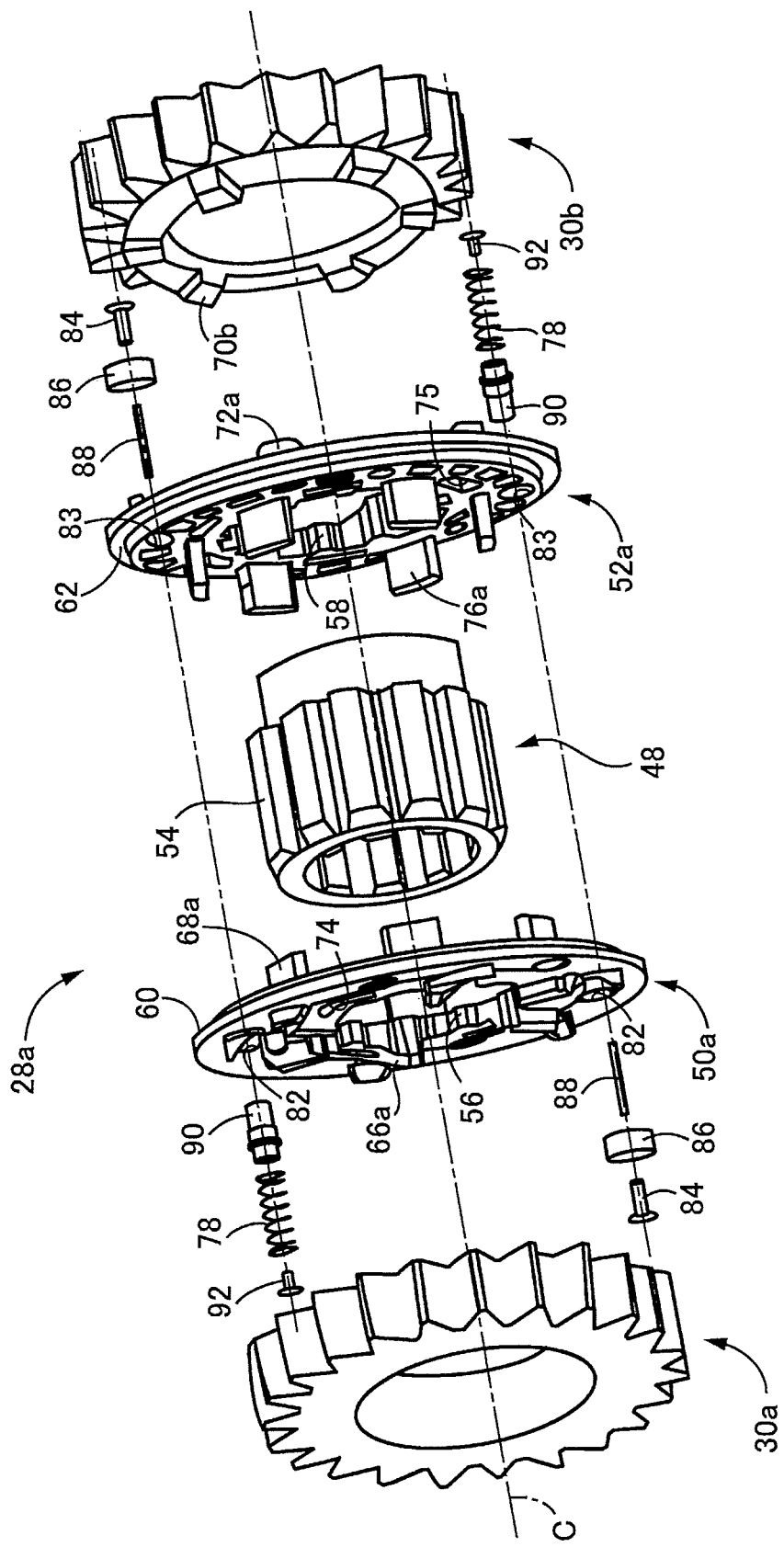
FIG. 3 is a perspective, exploded view of a first changeover mechanism shown in FIG. 1, in the vehicular transmission of the first embodiment.

Next, the structure of the changeover mechanism 28 will be described. FIG. 3 is a perspective, exploded view of the first changeover mechanism 28a. In the following, the structure of the first changeover mechanism 28a will be described. However, the second changeover mechanism 28b and the third changeover mechanism 28c will not be described since the structures of these mechanisms 28b, 28c are basically identical with that of the first changeover mechanism 28a.

The first changeover mechanism 28a mainly consists of a sleeve 48, a disc-shaped first dog ring 50a, and a disc-shaped second dog ring 52a. The first dog ring 50a is one example of the first ring of the disclosure. The second dog ring 52a is one example of the second ring of this disclosure.

The sleeve 48 has a cylindrical shape, and its inner circumferential portion is provided with spline teeth that are spline-fitted to the output shaft 22. The sleeve 48, which is spline-fitted to the output shaft 22, is rotated as a unit with the output shaft 22. Also, spline teeth 54 are provided on an outer circumferential surface of the sleeve 48, such that the spline teeth 54 are spline-fitted to the first dog ring 50a and the second dog ring 52a.

The first dog ring 50a is provided in the shape of a disc having a center on the axis C. An inner circumferential portion of the first dog ring 50a is provided with spline teeth 56 that are spline-fitted to the spline teeth 54 of the sleeve 48. Also, the second dog ring 52a is provided in the shape of a disc having a center on the axis C. An inner circumferential portion of the second dog ring 52a is provided with spline teeth 58 that are spline-fitted to the spline teeth 54 of the sleeve 48. Accordingly, once the first dog ring 50a and the second dog ring 52a are spline-fitted to the output shaft 22, the first dog ring 50a and the second dog ring 52a become unable to rotate relative to the output shaft 22, and are permitted to move relative to the output shaft 22 in the direction of the axis C. Thus, the first dog ring 50a and the second dog ring 52a, after being mounted in position, are fitted on the output shaft 22 such that the rings 52a, 52b cannot rotate relative to the output shaft 22, and can move relative to the output shaft 22 in the direction of the axis C.

In an outer circumferential edge portion of the first dog ring 50a, an L-shaped cutout 60 is provided over the entire circumference, on one side facing the second dog ring 52a in the direction of the axis C. Similarly, in an outer circumferential edge portion of the second dog ring 52a, an L-shaped cutout 62 is provided over the entire circumference, on one side facing the first dog ring 50a in the direction of the axis C. Then, if the first dog ring 50a and the second dog ring 52a are assembled together, the L-shaped cutouts 60, 62 cooperate with each other to form the above-mentioned groove 34.

On one surface of the first dog ring 50a which faces the input gear 30a in the direction of the axis C, a plurality of (six in this embodiment) first engaging teeth 66a that protrude toward the input gear 30a are provided equiangularly in the circumferential direction. The first engaging teeth 66a are provided at positions at which they mesh with a plurality of meshing teeth 70a (not shown in FIG. 3) provided on the input gear 30a, when the first dog ring 50a moves toward the input gear 30a in the direction of the axis C. The meshing teeth 70a are provided on one surface of the input gear 30a which faces the first changeover mechanism 28a in the direction of the axis C, such that the teeth 70a protrude from the above-indicated surface, and can mesh with the first engaging teeth 66a and fourth engaging teeth 76a which will be described later.

On the other surface of the first dog ring 50a which faces the second dog ring 52a in the direction of the axis C, a plurality of (six in this embodiment) second engaging teeth 68a that protrude toward the second dog ring 52a are provided equiangularly in the circumferential direction. The second engaging teeth 68a are arranged to pass through through-holes 75 (which will be described later) of the second dog ring 52a after assembling, such that the teeth 68 can mesh with the meshing teeth 70b of the second gear 30b.

In the first dog ring 50a, a plurality of (six in this embodiment) through-holes 74 that extend through the first dog ring 50a in the direction of the axis C are provided equiangularly in the circumferential direction. The through-holes 74 are provided at positions where fourth engaging teeth 76a (which will be described later) of the second dog ring 52a pass through the holes 74 after assembling.

On one surface of the second dog ring 52a which faces the second-speed gear 30b in the direction of the axis C, a plurality of (six in this embodiment) third engaging teeth 72a that protrude toward the second-speed gear 30b are provided equiangularly in the circumferential direction. The third engaging teeth 72a are provided at positions at which they mesh with the a plurality of meshing teeth 70b provided on the second-speed gear 30b, when the second dog ring 52a moves toward the second-speed gear 30b in the direction of the axis C. The engaging teeth 70b are provided on one surface of the second-speed gear 30b which faces the first changeover mechanism 28 in the direction of the axis C, such that the teeth 70b protrude from the above-indicated surface, and can mesh with the second engaging teeth 68a and the third engaging teeth 72a.

On the other surface of the second dog ring 52a which faces the first dog ring 50a in the direction of the axis C, a plurality of (six in this embodiment) fourth engaging teeth 76a that protrude toward the first dog ring 50a are provided equiangularly in the circumferential direction. The fourth engaging teeth 76a are arranged to pass through the through-holes 74 of the first dog ring 50a after assembling, such that the teeth 76a can mesh with the meshing teeth 70a of the input gear 30a.

In the second dog ring 52a, a plurality of (six in this embodiment) through-holes 75 that extend through the second dog ring 52a in the direction of the axis C are provided equiangularly in the circumferential direction. The through-holes 75 are provided at positions at which the second engaging teeth 68a pass through the through-holes 75 after assembling.

The first dog ring 50a and the second dog ring 52a are coupled at a plurality of locations (e.g., six to twelve locations) in the circumferential direction, via coupling mechanisms 80 (see FIG. 4) that will be described later. In the following, the coupling mechanism 80 that couples the first dog ring 50a with the second dog ring 52a will be described.

The coupling mechanisms 80 are provided in through-holes 82 provided in the first dog ring 50a and through-holes 83 provided in the second dog ring 52a. A plurality of through-holes 82, which extend through the first dog ring 50a in the direction of the axis C, are provided equiangularly in the circumferential direction. A plurality of through-holes 83, which extend through the second dog ring 52a in the direction of the axis C, are provided equiangularly in the circumferential direction. The through-holes 82, 83 have the same inside diameter, and are positioned such that the centers of the through-holes 82, 83 lie on a common axis, after the first dog ring 50a and the second dog ring 52a are assembled together.

Figure 4:
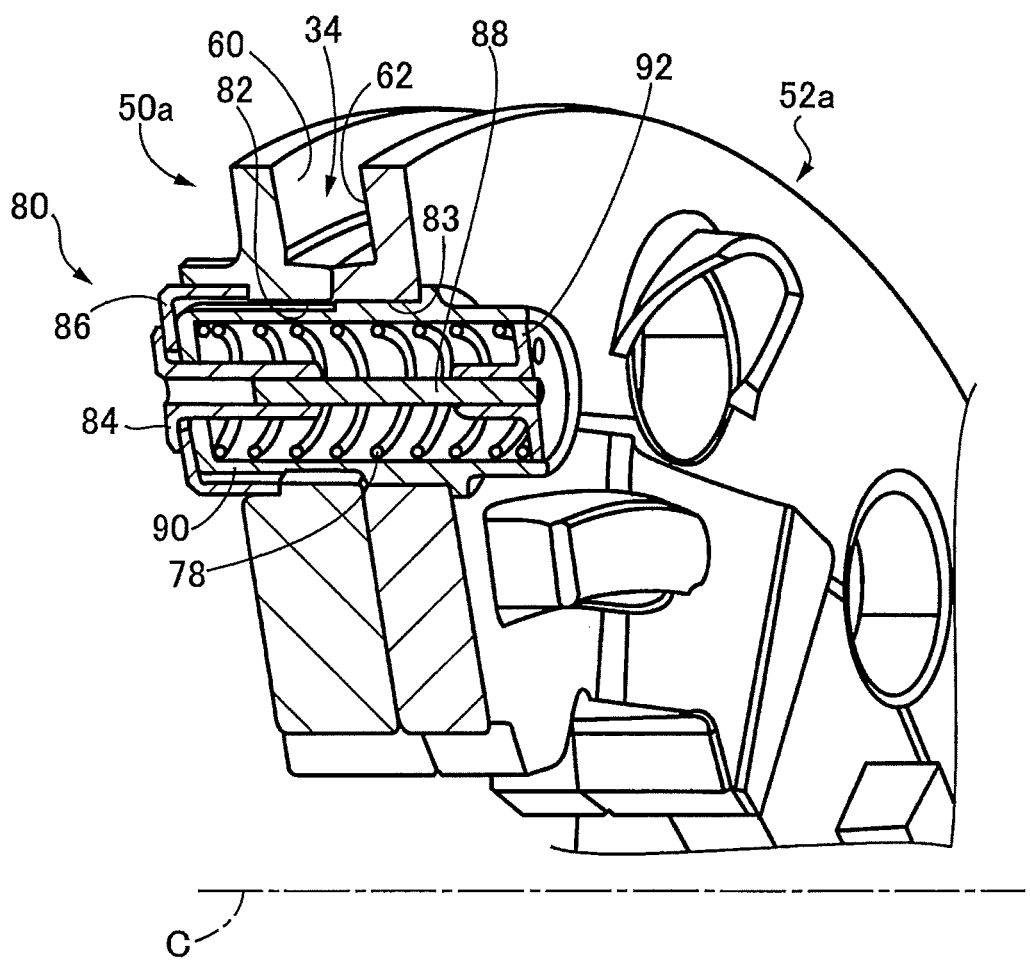
FIG. 4 is a cross-sectional view taken along a plane that passes a centerline of a connecting pin and an axis, showing a condition in which a first dog ring and a second dog ring are coupled by a coupling mechanism, in the vehicular transmission of the first embodiment.
Figure 5:
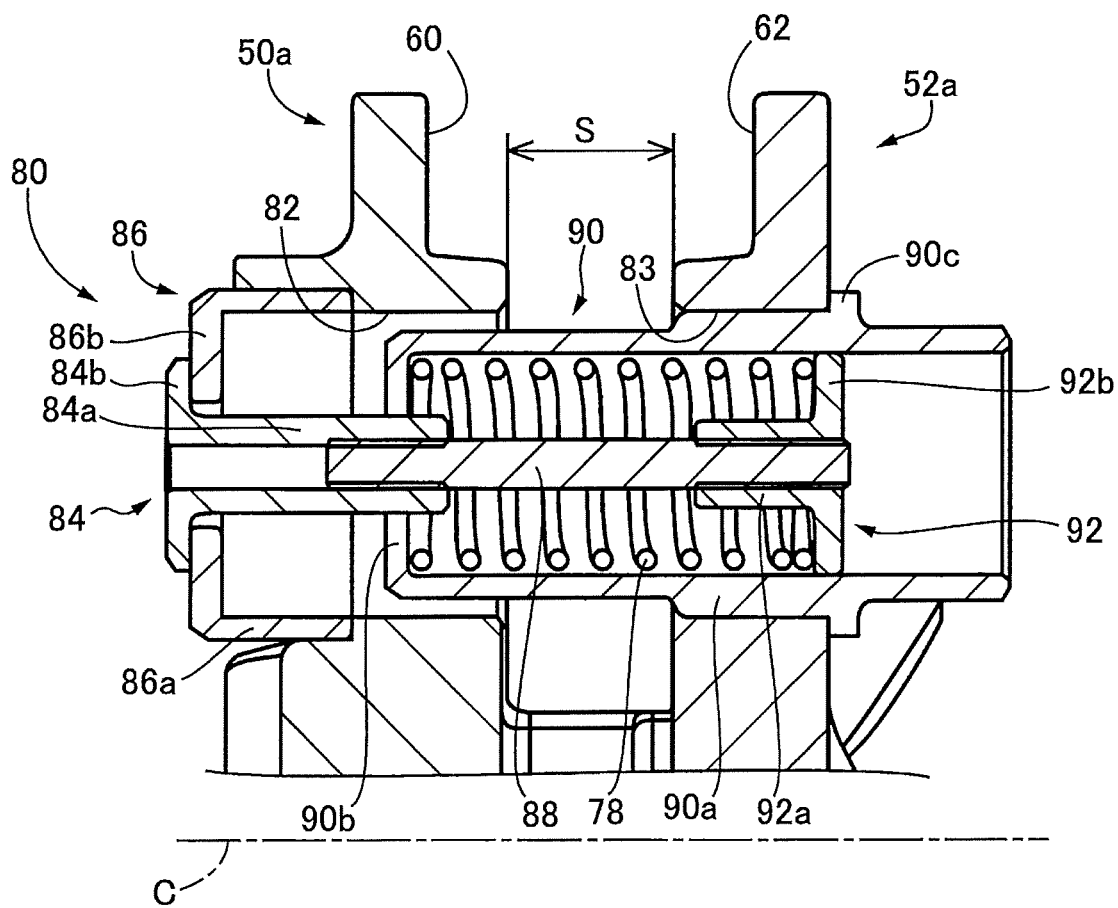
FIG. 5 is a cross-sectional view showing a condition where the first dog ring and the second dog ring move relative to and away from each other in the direction of the axis.

As shown in FIG. 3 through FIG. 5, the coupling mechanism 80 consists of a first engaging member 84, cover member 86, connecting pin 88, cylindrical member 90, spring 78, and a second engaging member 92. FIG. 4 is a cross-sectional view taken along a plane that passes the center line of the connecting pin 88 and the axis C, showing a condition where the first dog ring 50a and the second dog ring 52a are coupled by the coupling mechanism 80. FIG. 5 is a cross-sectional view showing a condition corresponding to that of FIG. 4, in which the first dog ring 50a and the second dog ring 52a move relative to each other, away from each other, in the direction of the axis C.

The cover member 86 is a cylindrical member with a bottom (see FIG. 5), which consists of a cylindrical portion 86a and a disc portion 86b. An outer circumferential surface of the cylindrical portion 86a is fitted in the through-hole 82 of the first dog ring 50a. A stepped portion is provided in the through-hole 82, and an opening-side end portion of the cylindrical portion 86a abuts on the stepped portion. Accordingly, the cover member 86 is inhibited by the stepped portion from moving toward the second dog ring 52a in the direction of the axis C. A hole is provided in the disc portion 86b of the cover member 86, so as to extend through the center of the disc portion 86b in the direction of the axis C, and the first engaging member 84 is inserted through the hole.

The first engaging member 84 consists of a shaft portion 84a and a disc portion 84b (see FIG. 5). A shaft hole that extends in parallel with the axis C is provided at the center of the shaft portion 84a. Also, one end of the connecting pin 88 is screwed in an axial end portion of the shaft hole of the shaft portion 84a on the side remote from the disc portion 84b in the direction of the axis C. The disc portion 84b abuts on the disc portion 86b of the cover member 86, so as to be inhibited from moving toward the second dog ring 52a in the direction of the axis C.

The cylindrical member 90 is a cylindrical member with a bottom (see FIG. 5), which consists of a cylindrical portion 90a and a disc portion 90b. An outer circumferential surface of the cylindrical portion 90a is fitted in the through-hole 83, in a condition where the disc portion 90b is inserted toward the first dog ring 50a. A hole that extends through the disc portion 90b in the direction of the axis C is provided in a central portion of the disc portion 90b, and the shaft portion 84a of the first engaging member 84 is inserted through the hole. Also, an annular flange portion 90c that protrudes radially outward is provided on an outer circumferential surface of the cylindrical portion 90a of the cylindrical member 90, and the flange portion 90c abuts on one end portion of the second dog ring 52a remote from the first dog ring 50a in the direction of the axis C. Accordingly, the cylindrical member 90 is inhibited from moving toward the first dog ring 50a in the direction of the axis C.

One end of the connecting pin 88 as viewed in the direction of the axis C is screwed in the shaft portion 84a of the first engaging member 84, and the other end of the connecting pin 88 as viewed in the direction of the axis C is screwed in the second engaging member 92. The second engaging member 92 consists of a shaft portion 92*a*, and a disc portion 92*b* connected to one end of the shaft portion 92*a* (see FIG. 5). A threaded hole parallel to the axis C is provided in a central portion of the shaft portion 92*a*, and the other end of the connecting pin 88 is screwed in the threaded hole. The disc portion 92*b* is a disc member that extends in radial directions from one axial end of the shaft portion 92*a*, and a radially outer edge portion of the disc portion 92*b* is slidably fitted or received in an inner circumferential surface of the cylindrical portion 90*a*.

A spring 78 is inserted and interposed between the disc portion 90*b* of the cylindrical member 90 and the disc portion 92*b* of the second engaging member 92. More specifically, one end of the spring 78 abuts on the disc portion 90*b*, and the other end of the spring 78 abuts on the disc portion 92*b*.

With the above arrangement, the first dog ring 50*a* is coupled to the second dog ring 52*a*, via the cover member 86, first engaging member 84, connecting pin 88, second engaging member 92, spring 78, and the cylindrical member 90.

FIG. 4 shows a condition where the first dog ring 50*a* and the second dog ring 52*a* are in abutting contact with each other. The length of the spring 78 is adjusted, so that the opposite ends of the spring 78 abut against the disc portion 90*b* of the cylindrical member 90 and the disc portion 92*b* of the second engaging member 92 at this time. Also, in the first embodiment, the length of the spring 78 is adjusted, such that, in a condition where the first dog ring 50*a* and the second dog ring 52*a* are close to or in contact with each other, the disc portion 86*b* of the cover member 86 and the disc portion 90*b* of the cylindrical member 90 abut on each other, and the second engaging member 92 is located in the vicinity of the opening of the cylindrical member 90 in the direction of the axis C.

FIG. 5 shows a condition where the first dog ring 50*a* and the second dog ring 52*a* are moved away from each other in the direction of the axis C. As shown in FIG. 5, when the first dog ring 50*a* and the second dog ring 52*a* are moved away from each other in the direction of the axis C, the cover member 86 and the first engaging member 84 are also moved away from the second dog ring 52*a*. Also, the connecting pin 88 and the second engaging member 92 move as a unit with the first engaging member 84. On the other hand, the cylindrical member 90 is inhibited by the second dog ring 52*a* from moving toward the first dog ring 50*a* in the direction of the axis C; therefore, the relative positions of the cylindrical member 90 and the second engaging member 92 in the direction of the axis C change. More specifically, as the first dog ring 50*a* and the second dog ring 52*a* move away from each other in the direction of the axis C, the relative distance between the disc portion 90*b* of the cylindrical member 90 and the disc portion 92*b* of the second engaging member 92 as measured in the direction of the axis C is shortened. Namely, the spring 78 is compressed as the stroke amount S as the amount of a gap between the first dog ring 50*a* and the second dog ring 52*a* in the direction of the axis C increases.

Thus, since the spring 78 is compressed as the stroke amount S between the first dog ring 50*a* and the second dog ring 52*a* increases, bias force F (elastic restoring force) that draws the first dog ring 50*a* and the second dog ring 52*a* to the original positions, i.e., the positions at which the first dog ring 50*a* and the second dog ring 52*a* are close to or in contact with each other, is generated. Thus, the coupling mechanism 80 generates bias force F in such a direction as to bring the first dog ring 50*a* and the second dog ring 52*a* closer to each other, according to the stroke amount S between the first dog ring 50*a* and the second dog ring 52*a*. Namely, the spring 78 is located within the through-hole 82 of the first dog ring 50*a* and the through-hole 83 of the second dog ring 52*a*. Then, the spring 78 biases the first dog ring 50*a* and the second dog ring 52*a* in such a direction that they become closer to each other, and is elastically deformed when the first dog ring 50*a* and the second dog ring 52*a* move away from each other in the direction of the axis. With this arrangement, the spring 78 is configured to apply bias force F in such a direction as to bring the first dog ring 50*a* and the second dog ring 52*a* closer to each other in the direction of the axis C.

A plurality of coupling mechanisms 80 as described above are arranged equiangularly in the circumferential direction of the first dog ring 50*a* and the second dog ring 52*a*, so that the springs 78 are also arranged equiangularly in the circumferential direction, and the bias force F is applied between the first dog ring 50*a* and the second dog ring 52*a* substantially uniformly in the circumferential direction. Also, the direction of mounting of the coupling mechanism 80 is changed alternately for each pair of coupling mechanisms 80 located adjacent to each other in the circumferential direction. More specifically, the cover member 86 is fitted in the first dog ring 50*a*, and the cylindrical member 90 is fitted in the second dog ring 52*a*, in FIG. 4 and FIG. 5. However, in the coupling mechanism 80 located adjacent to that of FIG. 4 and FIG. 5 in the circumferential direction, the cylindrical member 90 is fitted in the first dog ring 50*a*, and the cover member 86 is fitted in the second dog ring 52*a*.

Figure 6:
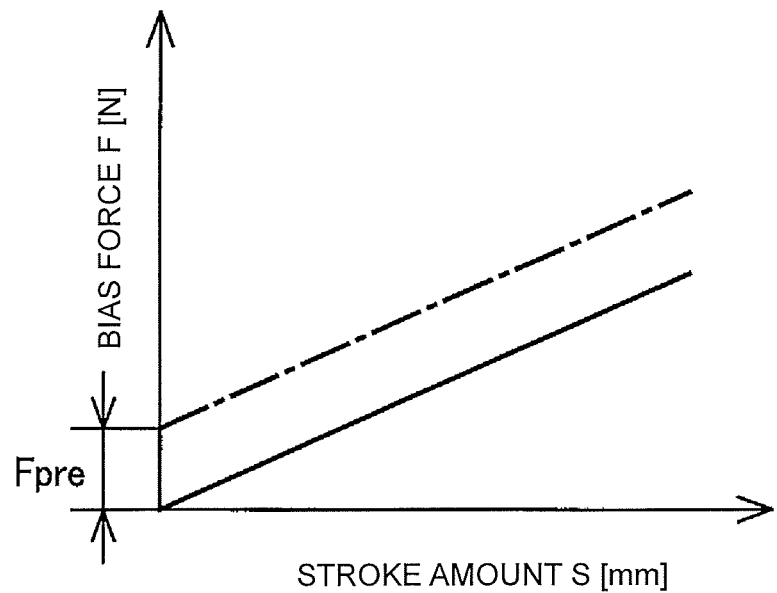
FIG. 6 is a view showing the relationship between the stroke amount as an amount of separation between the first dog ring and the second dog ring shown in FIG. 5, and bias force generated between the first dog ring and the second dog ring.

FIG. 6 shows the relationship between the stroke amount S as the amount of a gap between the first dog ring 50*a* and the second dog ring 52*a* in the direction of the axis C, and the bias force F generated between the first dog ring 50*a* and the second dog ring 52*a*, in the above-described structure in which the first dog ring 50*a* and the second dog ring 52*a* are coupled to each other by the coupling mechanisms 80. The stroke amount S of FIG. 6 is set to zero in a condition where the first dog ring 50*a* and the second dog ring 52*a* are in abutting contact with each other as shown in FIG. 4. As indicated by the solid line in FIG. 6, the bias force F linearly increases in proportion to the stroke amount S, since the amount of compression of the spring 78 increases as the stroke amount S increases.

Figure 7:
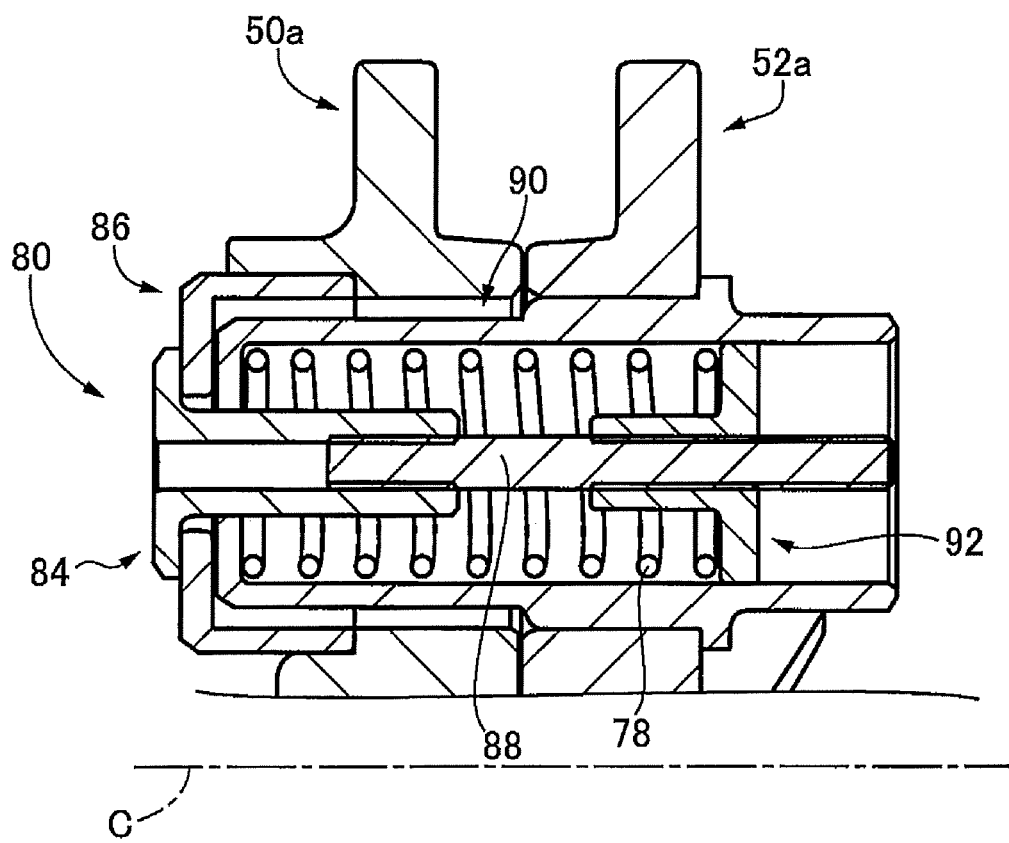
FIG. 7 is a cross-sectional view showing a condition where the first dog ring and the second dog ring abut on each other, and a pre-load as indicated by a one-dot chain line of FIG. 6 is applied.

By making an adjustment so that the spring 78 is compressed (elastically deformed) in advance, in a condition where the stroke amount S is equal to zero (in a condition where the first dog ring 50*a* and the second dog ring 52*a* are located adjacent to each other), it is possible to provide the spring 78 with a pre-load Fpre that acts in such a direction as to bring the first dog ring 50*a* and the second dog ring 52*a* closer to each other when the stroke amount S is equal to zero. For example, as shown in FIG. 7, by adjusting the position (mounting position) at which the second engaging member 92 is screwed to the connecting pin 88, and compressing the spring 78 by a given amount in a condition where the first dog ring 50*a* and the second dog ring 52*a* are in abutting contact with each other, the spring 78 is provided with the pre-load Fpre as indicated by the one-dot chain line in FIG. 6. In this connection, the magnitude of the pre-load Fpre can be adjusted as needed by adjusting the mounting position of the second engaging member 92.

Figure 8:
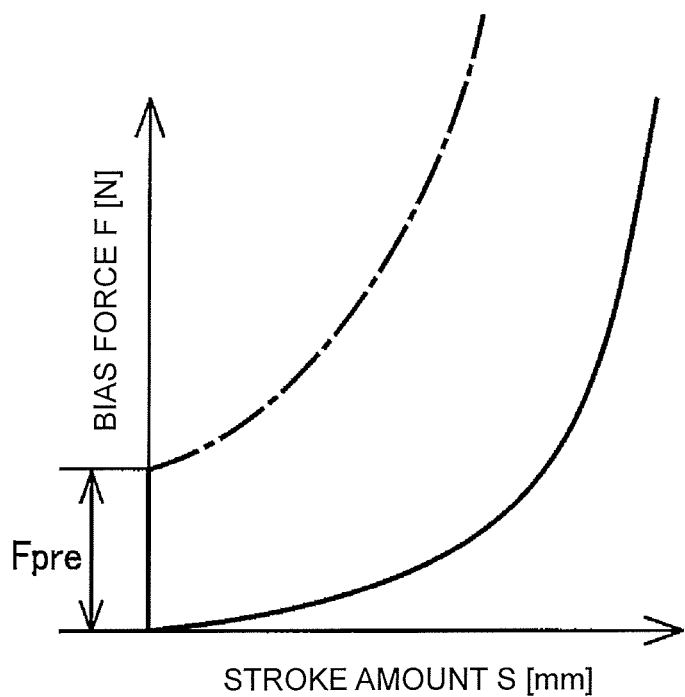
FIG. 8 is a view different from that of FIG. 6, showing another relationship between the stroke amount and the bias force.
Figure 9:
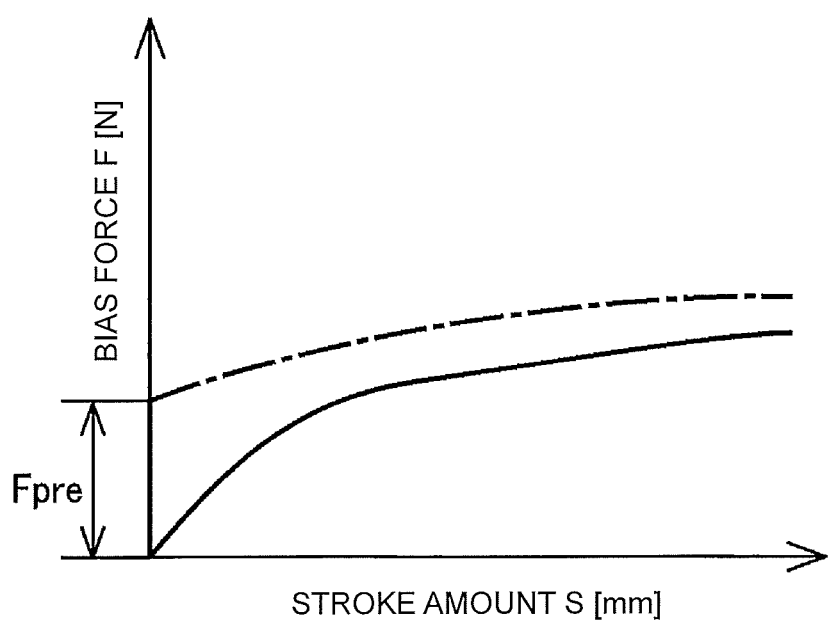
FIG. 9 is a view different from those of FIG. 6 and FIG. 8, showing another relationship between the stroke amount and the bias force.

It is also possible to freely adjust the bias force F in relation to the stroke amount S, by suitably adjusting characteristics of the spring 78 used in the coupling mechanism 80. For example, the bias force F relative to the stroke amount S can be changed non-linearly, as shown in FIG. 8 and FIG. 9. Also, the pre-load Fpre can also be adjusted as needed, by adjusting the amount of compression of the spring 78 when the stroke amount S is zero.

Next, operation of the changeover mechanism 28 during a gearshift will be described. While the following description is concerned with an upshift from the first-speed gear position 1st to the second-speed gear position 2nd, basic operation does not change even with respect to other gearshifts (i.e., upshifts and downshifts other than the upshift from the first-speed gear position 1st to the second-speed gear position 2nd), of which description will not be provided. Since the second changeover mechanism 28b is not involved in the upshift from the first-speed gear position 1st to the second-speed gear position 2nd (namely, the second changeover mechanism 28b does not transmit power), no description will be provided with respect to the second changeover mechanism 28.

Figure 10:
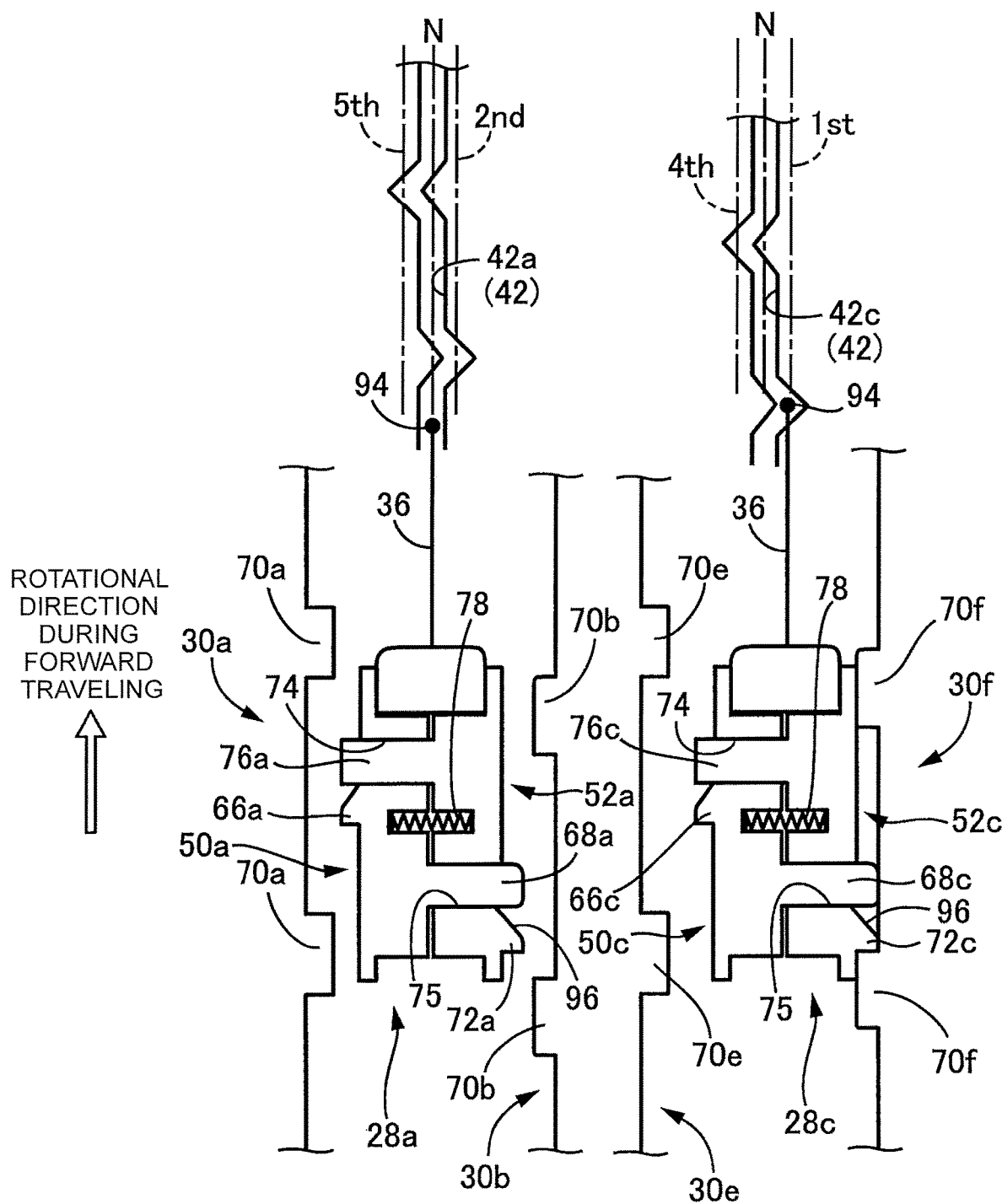
FIG. 10 is a view simply showing operating states of a first changeover mechanism and a third changeover mechanism, during traveling in a first-speed gear position, in the vehicular transmission of the first embodiment.

FIG. 10 simply shows operating states of the first changeover mechanism 28a and the third changeover mechanism 28c, during traveling in the first-speed gear position 1st. In FIG. 10, the first changeover mechanism 28a is located on the left-hand side, and a part of the first changeover mechanism 28a and the third changeover mechanism 28c is laid out on a plane and simply illustrated. On the opposite sides of the first changeover mechanism 28a, the meshing teeth 70a of the input gear 30a and the meshing teeth 70b of the second-speed gear 30b, which can mesh with the first changeover mechanism 28a, are laid out on a plane and illustrated. Also, on the opposite sides of the third changeover mechanism 28c, the meshing teeth 70e of the fourth-speed gear 30e and the meshing teeth 70f of the first-speed gear 30f, which can mesh with the third changeover mechanism 28c, are laid out on a plane and illustrated.

The first changeover mechanism 28a of FIG. 10 will be described. In the first changeover mechanism 28a, the first dog ring 50a is located on the left-hand side on the paper, and the second dog ring 52a is located on the right-hand side on the paper. The first dog ring 50a and the second dog ring 52a are biased toward each other by the springs 78 that constitute the coupling mechanisms 80. The first dog ring 50a is provided with the first engaging teeth 66a that protrude toward the input gear 30a, and the second engaging teeth 68a that extend through the through-holes 75 of the second dog ring 52a, and protrude toward the second-speed gear 30b. Also, the second dog ring 52a is provided with the third engaging teeth 72a that protrude toward the second-speed gear 30b, and the fourth engaging teeth 76a that extend through the through-holes 74 of the first dog ring 50a, and protrude toward the input gear 30a. The first engaging teeth 66a are one example of the first engaging teeth of the disclosure. The second engaging teeth 68a are one example of the second engaging teeth of the disclosure. The third engaging teeth 72a are one example of the first engaging teeth of the disclosure. The fourth engaging teeth 76a are one example of the second engaging teeth of the disclosure.

The shift fork 36 is fitted in the groove 34 provided by the first dog ring 50a and the second dog ring 52a. The shift fork 36 is also provided with a protrusion 94 indicated by a black circle in FIG. 10, and the protrusion 94 is engaged with the shift groove 42 provided on the shift shaft 40. Accordingly, if the shape of the shift groove 42 engaged with the protrusion 94 changes as the shift shaft 40 rotates, the shift fork 36 moves along with the protrusion, based on the shape of the shift groove 42.

The structure of the third changeover mechanism 28c shown in FIG. 10 is not basically different from that of the first changeover mechanism 28a as described above, and therefore, will not be described herein. In the following description, reference numeral 42a is assigned to the shift groove 42 in which the protrusion 94 of the first changeover mechanism 28a is fitted, and reference numeral 42c is assigned to the shift groove 42 in which the protrusion 94 of the third changeover mechanism 28c is fitted (see FIG. 10). Also, reference numeral 50c is assigned to the first dog ring that constitutes the third changeover mechanism 28c, and reference numeral 52c is assigned to the second dog ring, while reference numerals 66c, 68c, 72c, 76c are respectively assigned to the first engaging teeth to the fourth engaging teeth which constitute the third changeover mechanism 28c (see FIG. 10). The first engaging teeth 66c are one example of the first engaging teeth of the disclosure. The second engaging teeth 68c are one example of the second engaging teeth of the disclosure. The third engaging teeth 72c are one example of the first engaging teeth of the disclosure. The fourth engaging teeth 76c are one example of the second engaging teeth of the disclosure.

In FIG. 10, the upward direction on the paper indicated by the arrow represents the direction of rotation when the vehicle is traveling forward in the first-speed gear position 1st. Namely, during forward traveling, the input gear 30a, second-speed gear 30b, fourth-speed gear 30e, and the first-speed gear 30f move upward on the paper of FIG. 10. In this connection, the input gear 30a, second-speed gear 30b, fourth-speed gear 30e, and the first-speed gear 30f are rotated at the rotational speeds based on the rotational speed of the engine 12, and the speed ratio or gear ratio mechanically set for each gear position. More specifically, the rotational speed of the first-speed gear 30f corresponding to the first-speed gear position 1st is the lowest, and the rotational speed of the shift gear corresponding to the higher-speed gear position becomes higher. The first changeover mechanism 20a and the third changeover mechanism 28c also move upward on the paper of FIG. 10 during forward traveling. The first changeover mechanism 28a and the third changeover mechanism 28c rotate as a unit with the output shaft 22. Also, inclined faces 96 are provided on the third engaging teeth 72a that protrude from the second dog ring 52a located adjacent to the second-speed gear 30b, toward the second-speed gear 30b. Similarly, inclined faces 96 are provided on the third engaging teeth 72c that protrude from the second dog ring 52c located adjacent to the first-speed gear 30f, toward the first-speed gear 30f.

The operating states of the first changeover mechanism 28a and the third changeover mechanism 28c, during traveling in the first-speed gear position 1st shown in FIG. 10, will be described. During traveling in the first-speed gear position 1st, the shift fork 36 fitted in the groove 34 of the first changeover mechanism 28a is moved to a neutral position (N position) based on the shift groove 42a. At this time, each of the engaging teeth of the first changeover mechanism 28a does not mesh with any of the meshing teeth 70a of the input gear 30a and the meshing teeth 70b of the second-speed gear 30b, and the first changeover mechanism 28a is rotated relative to the input gear 30a and the second-speed gear 30b. Namely, power transmission with the first changeover mechanism 28a and the output shaft 22 is interrupted.

On the other hand, with regard to the third changeover mechanism 28c, the shift fork 36 fitted in the groove 34 is moved to a 1st-gear position (1st position) based on the shape of the shift groove 42c. At this time, since the first-speed gear 30f rotates faster than the second dog ring 52c of the third changeover mechanism 28c, the third engaging teeth 72c and the meshing teeth 70f of the first-speed gear 30f mesh with each other as shown in FIG. 10, and power can be transmitted between the third changeover mechanism 28c and the first-speed gear 30f. Accordingly, the first-speed gear 30f and the output shaft 22 are coupled via the third changeover mechanism 28c, such that power can be transmitted therebetween, and the first-speed gear position 1st is established.

FIG. 11A through FIG. 11F show operating states of the first changeover mechanism 28a and the third changeover mechanism 28c in chronological order in a shift transition period of a gearshift from the first-speed gear position 1st to the second-speed gear position 2nd. In the shift transition period, the first and third changeover mechanisms 28a, 28c operate in the order of FIG. 11A, FIG. 11B, . . . , FIG. 11F.

Figure 11A:
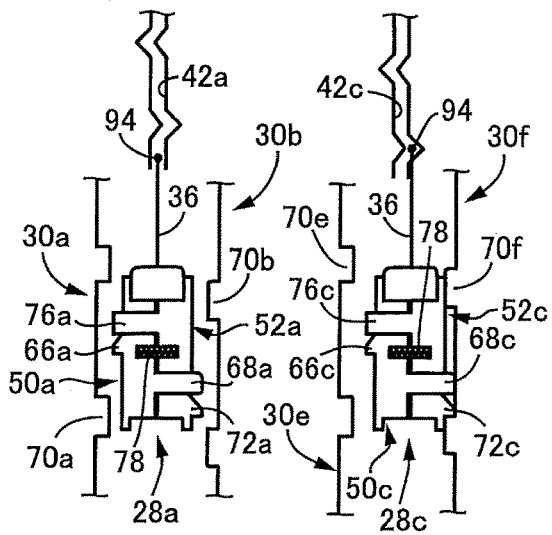
FIG. 11A is a view showing operating states of the first changeover mechanism and the third changeover mechanism, in a shift transition period from the first-speed gear positon to a second-speed gear position, in the vehicular transmission.

FIG. 11A shows a condition where the vehicle is traveling in the first-speed gear position 1st (namely, before the start of the gearshift). This condition is totally identical with that of FIG. 10 as described above, and therefore, will not be described.

Figure 11B:
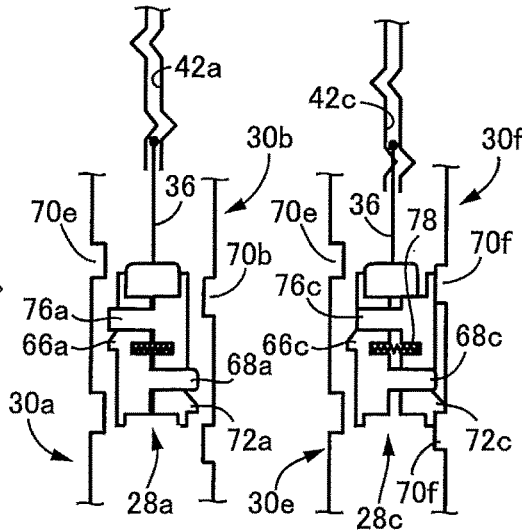
FIG. 11B is a view showing operating states of the first changeover mechanism and the third changeover mechanism, following those of FIG. 11A, in the shift transition period from the first-speed gear positon to the second-speed gear position, in the vehicular transmission.

FIG. 11B shows operating states at the time when an upshift to the second-speed gear position 2nd is started. In the third changeover mechanism 28c, the shift fork 36 moves in a direction (to the left on the paper) away from the first-speed gear 30f according to change of the shape of the shift groove 42c, as the shift shaft 40 rotates. At this time, the first dog ring 50c, which is pushed by the shift fork 36, moves away from the second dog ring 52c, and bias force F is generated between the first dog ring 50c and the second dog ring 52c. On the other hand, power is kept transmitted between the third engaging teeth 72c of the second dog ring 52c and the meshing teeth 70f of the first-speed gear 30f. Therefore, the third engaging teeth 72c and the meshing teeth 70f are kept in meshing engagement with each other, against the bias force F of the spring 78, due to friction between the third engaging teeth 72c and the meshing teeth 70f. Accordingly, the first dog ring 50c and the second dog ring 52c of the third changeover mechanism 28c are separated from each other. In FIG. 11B, the spring 78 appears to be extended when the first dog ring 50c and the second dog ring 52c are separated from each other. However, in fact, the spring 78 is compressed, based on the structure of FIG. 4.

Figure 11C:
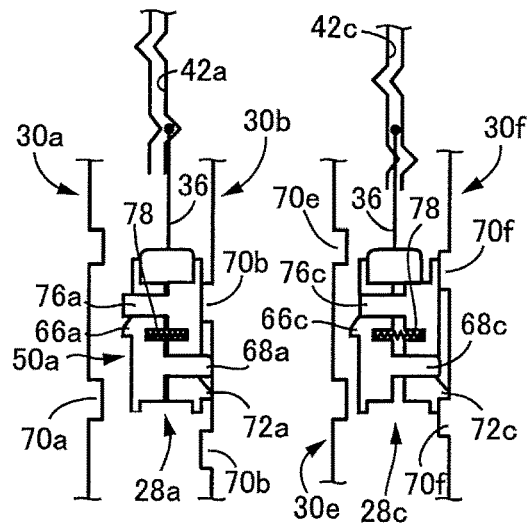
FIG. 11C is a view showing operating states of the first changeover mechanism and the third changeover mechanism, following those of FIG. 11B, in the shift transition period from the first-speed gear positon to the second-speed gear position, in the vehicular transmission.

FIG. 11C shows a condition where the first changeover mechanism 28a moves toward the second-speed gear 30b, so as to form the second-speed gear position 2nd. As the shift shaft 40 rotates, the position of the protrusion of the shift fork 36 which engages with the shift groove 42a changes, and the first changeover mechanism 28a is pushed by the shift fork 36, to move toward the 2nd-speed gear 30b. At this time, the third engaging teeth 72a of the first dog ring 50a and the meshing teeth 70b of the second-speed gear 30b are brought into a condition where the teeth 72a, 70b can mesh with each other (the teeth 72a, 70b have not meshed with each other in the condition of FIG. 11C).

Figure 11D:
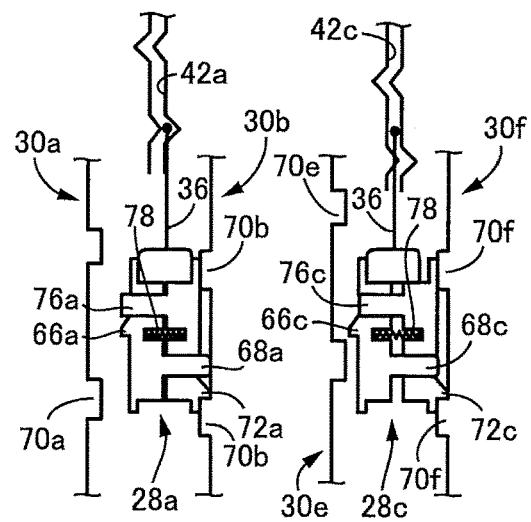
FIG. 11D is a view showing operating states of the first changeover mechanism and the third changeover mechanism, following those of FIG. 11C, in the shift transition period from the first-speed gear positon to the second-speed gear position, in the vehicular transmission.

FIG. 11D shows a condition where the third engaging teeth 72a of the first dog ring 50a are in meshing engagement with and the meshing teeth 70b of the second-speed gear 30b, in the first changeover mechanism 28a. In FIG. 11D, the rotational speed of the second-speed gear 30b is higher than the rotational speed of the first changeover mechanism 28a; therefore, once the condition of FIG. 11C is established, the third engaging teeth 72a and the meshing teeth 70b of the second-speed gear 30b are promptly brought into meshing engagement. At this time, the third engaging teeth 72a of the first changeover mechanism 28a and the meshing teeth 70b of the second-speed gear 30b mesh with each other, and at the same time, the third engaging teeth 72c of the third changeover mechanism 28c and the meshing teeth 70f of the first-speed gear 30f mesh with each other, so that a simultaneous meshing condition is established.

Figure 11E:
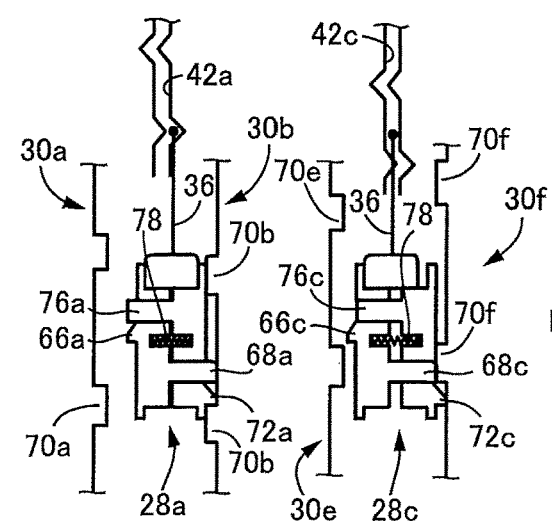
FIG. 11E is a view showing operating states of the first changeover mechanism and the third changeover mechanism, following those of FIG. 11D, in the shift transition period from the first-speed gear positon to the second-speed gear position, in the vehicular transmission.

FIG. 11E shows a condition where the third engaging teeth 72c of the first dog ring 50c and the meshing teeth 70f of the first-speed gear 30f are disengaged from each other, in the third changeover mechanism 28c. In FIG. 11D, once the meshing teeth 70b of the second-speed gear 30b mesh with the third engaging teeth 72a of the first changeover mechanism 28a, the output shaft 22 is rotated at the rotational speed based on the second-speed gear position 2nd; therefore, the rotational speed of the first dog ring 50c of the third changeover mechanism 28c becomes higher than the rotational speed of the first-speed gear 30f. Accordingly, the third engaging teeth 72c of the first dog ring 50c and the meshing teeth 70f of the first-speed gear 30f are disengaged from each other.

Figure 11F:
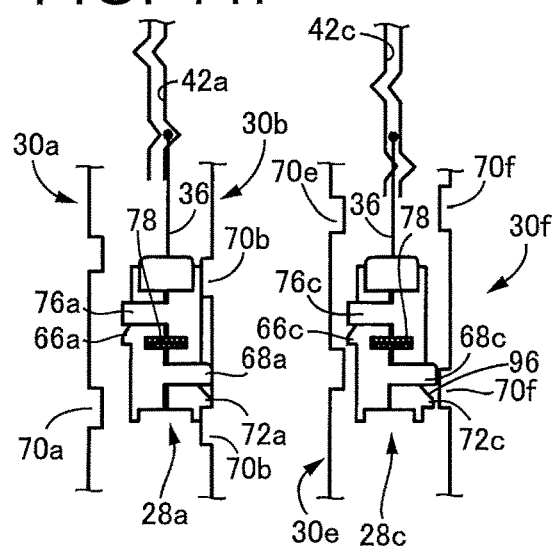
FIG. 11F is a view showing operating states of the first changeover mechanism and the third changeover mechanism, following those of FIG. 11E, in the shift transition period from the first-speed gear positon to the second-speed gear position, in the vehicular transmission.

FIG. 11F shows a condition where the second dog ring 52c of the third changeover mechanism 28c is drawn or pulled toward the first dog ring 50c. In FIG. 11E, as the third engaging teeth 72c and the meshing teeth 70f of the first-speed gear 30f are disengaged from each other, force due to friction between the third engaging teeth 72c and the meshing teeth 70f is eliminated (the force due to friction becomes smaller than the bias force F); therefore, the second dog ring 52c is drawn toward the first dog ring 50c under the bias force F of the spring 78. Accordingly, the third changeover mechanism 28c is brought into a neutral condition where it does not mesh with any of the meshing teeth 70a-70f, and the gearshift to the second-speed gear position 2nd is completed. The third engaging teeth 72c are provided with the inclined faces 96; therefore, even if drawing under the bias force F of the spring 78 is delayed, the meshing teeth 70f are brought into contact with the inclined faces 96, and the second dog ring 52c is pushed out by the inclined faces 96, so that the third engaging teeth 72c are surely disengaged from the meshing teeth 70f. Thus, once the third engaging teeth 72a of the first changeover mechanism 28a are brought into meshing engagement with the meshing teeth 70b of the second-speed gear 30b, the third engaging teeth 72c of the third changeover mechanism 28c and the meshing teeth 70f of the first-speed gear 30f are promptly disengaged from each other; therefore, interruption of torque transmission during shifting is prevented. The operation of FIG. 11C through FIG. 11F is carried out in a very short time.

In this connection, the magnitude of the bias force F is adjusted so that the gearshift as described above is favorably carried out. More specifically, the magnitude of the bias force F is set so that the third engaging teeth 72c of the second dog ring 52c and the meshing teeth 70f of the first-speed gear 30f are kept in meshing engagement, even if the first dog ring 50c is moved away from the second dog ring 52c, in a condition where power is transmitted between the second dog ring 52c and the first-speed gear 30f, with the third engaging teeth 72c meshing with the meshing teeth 70f. Further, the magnitude of the bias force F is set so that the second dog ring 52c is promptly drawn toward the first dog ring 50c, once power stops being transmitted between the second dog ring 52c and the first-speed gear 30f. Thus, the magnitude of the bias force F needs to be optimally adjusted. However, in the first embodiment, the bias force F can be adjusted to the optimum magnitude, by changing characteristics of the spring 78, or adjusting the pre-load Fpre. While the above description is concerned with the upshift from the first-speed gear position 1st to the second-speed gear position 2nd by way of example, the basic operation does not change with respect to other gearshifts, which will not be described.

Next, meshing engagement between the engaging teeth of the changeover mechanism 28 and the meshing teeth 70 (the meshing teeth 70a-70f will be simply referred to as "meshing teeth 70" when they are not distinguished) of the shift gear will be described. In the following, meshing engagement between the engaging teeth 68a, 72a of the first changeover mechanism 28a and the meshing teeth 70b of the second-speed gear 30b during a gearshift to the second-speed gear position 2nd will be described by way of example.

FIG. 12A through FIG. 12E show one example of a process of meshing between the second engaging teeth 68a and third engaging teeth 72a of the first changeover mechanism 28a and the meshing teeth 70b of the second-speed gear 30b when the transmission 10 is shifted to the second-speed gear position. In FIG. 12A-FIG. 12E, a part of the second engaging teeth 68a, third engaging teeth 72a, and meshing teeth 70b, which are periodically arranged in the circumferential direction, is laid out on a plane, and only one tooth of the second engaging teeth 68a, only one tooth of the meshing teeth 70b, and only two teeth of the third engaging teeth 72a are illustrated. The gearshift proceeds in the order of FIG. 12A to FIG. 12E, and FIG. 12E shows a condition where the gearshift is completed, and the third engaging teeth 72a and the meshing teeth 70b are in meshing engagement with each other. In FIG. 12A-FIG. 12E, the arrow pointing to the right on the paper represents the direction of rotation when the vehicle travels forward. In FIG. 12A-FIG. 12E, when the transmission 10 is shifted to the 2nd-speed gear position 2nd, the second engaging teeth 68a and the third engaging teeth 72a move upward on the paper, toward the meshing teeth 70b.

Figure 12A:
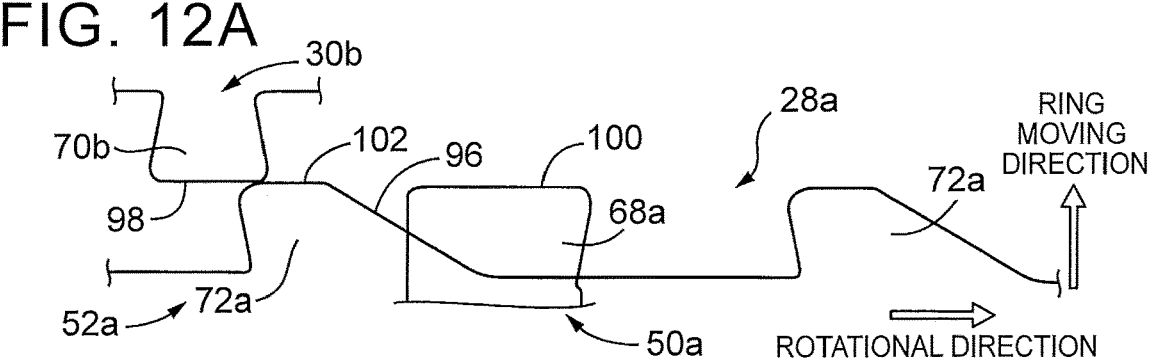
FIG. 12A is a view showing one example of a process of meshing between second engaging teeth and third engaging teeth of the first changeover mechanism with meshing teeth of a second-speed gear, when the transmission is shifted to a second-speed gear position.

As shown in FIG. 12A, one of the third engaging teeth 72a and the second engaging tooth 68a are located adjacent to each other in the circumferential direction, and the second engaging tooth 68a is located ahead of the third engaging tooth 72a adjacent to the second engaging tooth 68a as viewed in the rotational direction during forward traveling (the right direction on the paper). An end face 98 of the meshing tooth 70b, which faces the second engaging tooth 68a and the third engaging tooth 72a, is provided as a flat face. Also, an end face 100 of the second engaging tooth 68a and an end face 102 of the third engaging tooth 72a, which face the meshing tooth 70b of the third engaging tooth 72a, are also provided as flat faces. The end face 100 and the end face 102 are at the same level or height, when they are not in contact with the meshing tooth 70b. Namely, in a condition where the first dog ring 50a and the second dog ring 52a are located adjacent to each other, the end face 100 and the end face 102 are set to be on the same plane. Accordingly, when the meshing tooth 70b comes into contact with at least one of the second engaging tooth 68a and the third engaging tooth 72a, the meshing tooth 70b can move (rotate) relative to the second engaging tooth 68a and the third engaging tooth 72a while sliding on the end faces 100, 102.

Figure 12B:
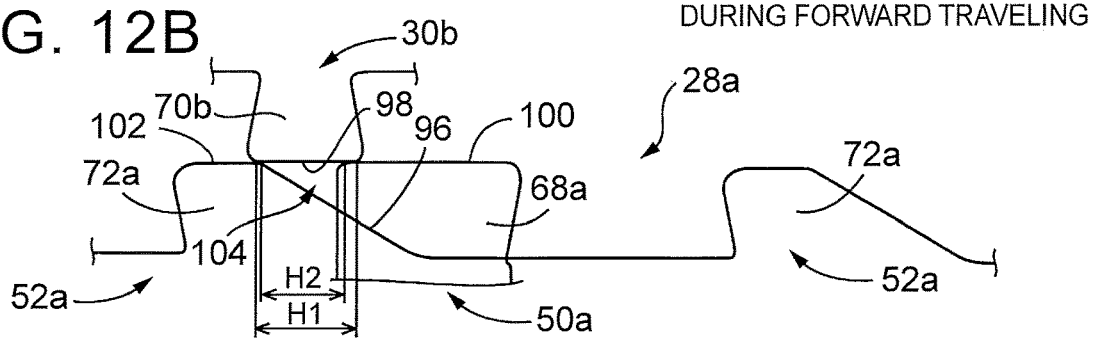
FIG. 12B is a view showing a shifting state following that of FIG. 12A, in the process of meshing between the second engaging teeth and third engaging teeth of the first changeover mechanism with the meshing teeth of the second-speed gear, when the transmission is shifted to the second-speed gear position.

As shown in FIG. 12B, the length H1 of the end face 98 of the meshing tooth 70b as measured in the circumferential direction is set to be larger than the distance H2 between the second engaging tooth 68a and the third engaging tooth 72a located adjacent to each other in the circumferential direction. With this arrangement, the meshing tooth 70b is prevented from falling into a recess 104 provided between the second engaging tooth 68a and the third engaging tooth 72a, due to the inclined face 96 provided on the third engaging tooth 72a.

The process of meshing when the transmission 10 is shifted to the second-speed gear position 2nd will be described step by step, using FIG. 12A to FIG. 12E.

FIG. 12A shows a condition established when the gearshift is started, and the first dog ring 50a and the second dog ring 52a are moved toward the second-speed gear 30b, so that the end face 102 of each third engaging tooth 72a comes into contact with the end face 98 of the corresponding meshing tooth 70b. Once the end face 102 of the third engaging tooth 72a and the end face 98 of the meshing tooth 70b contact with each other, the third engaging tooth 72a cannot proceed any further. Also, during driving (during acceleration), the second-speed gear 30b rotates at the higher rotational speed than the second engaging tooth 68a and the third engaging tooth 72a, so that the meshing tooth 70a moves relative to the third engaging tooth 72a to the right on the paper, as shown in FIG. 12B, and the end face 98 of the meshing tooth 70b is brought into contact with both the end face 100 of the second engaging tooth 68a and the end face 102 of the third engaging tooth 72a.

Figure 12C:
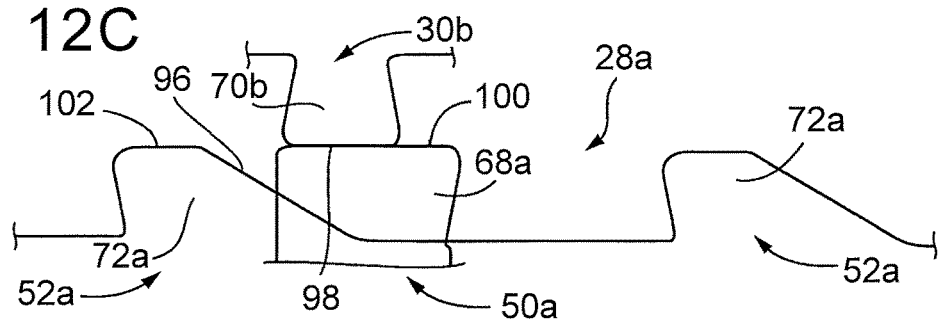
FIG. 12C is a view showing a shifting state following that of FIG. 12B, in the process of meshing between the second engaging teeth and third engaging teeth of the first changeover mechanism with the meshing teeth of the second-speed gear, when the transmission is shifted to the second-speed gear position.
Figure 12D:
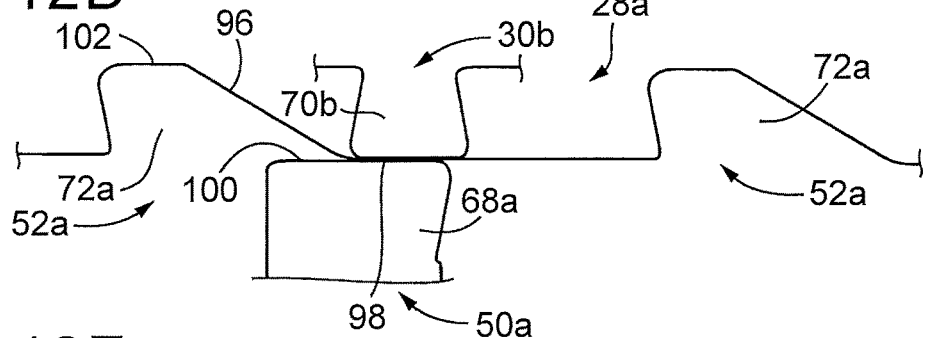
FIG. 12D is a view showing a shifting state following that of FIG. 12C, in the process of meshing between the second engaging teeth and third engaging teeth of the first changeover mechanism with the meshing teeth of the second-speed gear, when the transmission is shifted to the second-speed gear position.
Figure 12E:
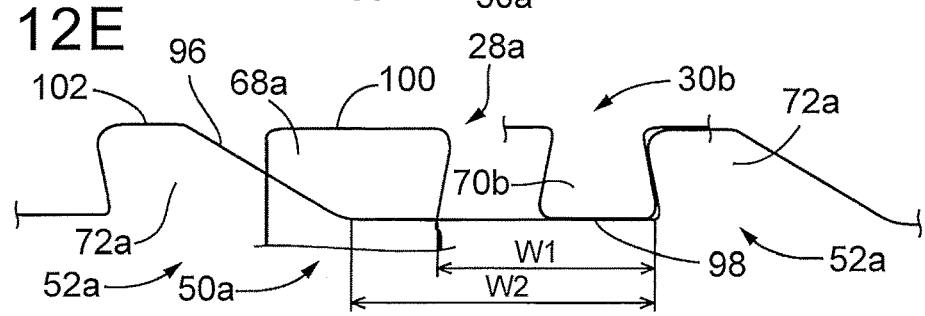
FIG. 12E is a view showing a shifting state following that of FIG. 12D, in the process of meshing between the second engaging teeth and third engaging teeth of the first changeover mechanism with the meshing teeth of the second-speed gear, when the transmission is shifted to the second-speed gear position.

As the meshing tooth 70b moves relative to the third engaging tooth 72a further to the right on the paper, the meshing tooth 70b and the third engaging tooth 72a cease to contact with each other, and are brought into a condition as shown in FIG. 12C. Namely, the meshing tooth 70b contacts with the second engaging tooth 68a. Here, since the second engaging tooth 68a is arranged to be able to move downward on the paper, relative to the third engaging tooth 72a, when the spring 78 is compressed (elastically deformed). Therefore, if the first dog ring 50a and the second dog ring 52a further move toward the second-speed gear 30b, the spring 78 is compressed, and the second engaging tooth 68a is pushed inward by the meshing tooth 70b. As a result, as shown in FIG. 12D, the meshing tooth 70b is brought into contact with the second dog ring 52a. Since the rotational speed of the meshing tooth 70b is higher than that of the second dog ring 52a, the meshing tooth 70b and another third engaging tooth 72a are brought into meshing engagement such that power can be transmitted therebetween. In the meantime, the second engaging tooth 68a returns to the original position under the bias force F of the spring 78, once the tooth 68a ceases to contact with the meshing tooth 70b.

With the above arrangement, after shifting, the meshing tooth 70b can move between the second engaging tooth 68a and the third engaging tooth 72a. Namely, after shifting, the meshing tooth 70b can move within a range W1 of FIG. 12E. On the other hand, in the shift transition period, the second engaging tooth 68a is pushed in by the meshing tooth 70b, so that the meshing tooth 70b can move within a range W2. Thus, in the shift transition period, the meshing tooth 70b can move within the increased range W2, which makes it easier for the meshing tooth 70b to be engaged with the third engaging tooth 72a. Also, the range W1 over which the meshing tooth 70b can move is narrowed after shifting, so that backlash is reduced. Accordingly, shock caused by collision of the meshing tooth 70b with the third engaging tooth 72a, due to a rapid acceleration from decelerating traveling, for example, is reduced. During drive traveling, the meshing teeth 70b mesh with the third engaging teeth 72a. During driven traveling (such as during decelerating traveling), the meshing teeth 70b mesh with the second engaging teeth 68a. While the above description is concerned with the second engaging teeth 68a and third engaging teeth 72a of the first changeover mechanism 28a and the meshing teeth 70*b* of the second-speed gear 30*b*, by way of example, the structure as described above may be similarly provided with respect to other changeover mechanisms and meshing teeth of other shift gears, and the above-described effects can be obtained.

As described above, according to the first embodiment, the springs 78 are provided for biasing the first dog ring 50*c* and the second dog ring 52*c* toward each other. Therefore, if the first dog ring 50*c* is moved away from the second dog ring 52*c*, the springs 78 are compressed, so that bias force F is applied to the second dog ring 52*c* in a direction to cause the ring 52*c* to come closer to the first dog ring 50*c*. Accordingly, if the first dog ring 50*c* is moved away from the second dog ring 52*c* during shifting, in a condition where the third engaging teeth 72*c* of the second dog ring 52*c* and the meshing teeth 70*f* of the first-speed gear 30*f* are in meshing engagement, the bias force F is applied to the second dog ring 52*c*; then, if the force due to friction between the engaging teeth 72*c* of the second dog ring 52*c* and the meshing teeth 70*f* of the first-speed gear 30*f* becomes smaller than the bias force F, the second dog ring 52*c* is drawn toward the first dog ring 50*c* due to the bias force F, and the third engaging teeth 72*c* of the second dog ring 52*c* and the meshing teeth 70*f* of the first-speed gear 30*f* are promptly disengaged from each other. Thus, owing to the bias force F produced by the spring 78, the third engaging teeth 72*c* of the second dog ring 52*c* and the meshing teeth 70*f* of the first-speed gear 30*f* are surely disengaged from each other.

The second engaging teeth 68*a* pass through the through-holes 75 provided in the second dog ring 52*a*. If the second engaging teeth 68*a* collide with the meshing teeth 70*b* of the second-speed gear 30*b* when the first dog ring 50*a* and the second dog ring 52*a* are moved toward the second-speed gear 30*b*, the springs 78 are elastically deformed, so as to reduce shock due to the collision. Also, even if the second engaging teeth 68*a* come into contact with the meshing teeth 70*b* during movement of the first dog ring 50*a* and the second dog ring 52*a*, the second engaging teeth 68*a* are pushed away by the meshing teeth 70*b*, to thereby move the second dog ring 52*a*, and the meshing teeth 70*b* and the third engaging teeth 72*a* can be brought into meshing engagement. Further, after meshing, the second engaging teeth 68*a* return to the original positions by means of the springs 78. Accordingly, the range W1 over which each meshing tooth 70*b* can move (can rotate relative to the engaging teeth) is defined between the corresponding third engaging tooth 72*a* and second engaging tooth 68*a*, and the distance over which the meshing tooth 70*b* can move is shorter than the range W2 over which the tooth 70*b* can move during the shift transition period. Therefore, backlash between the meshing teeth 70*b* and the engaging teeth 68*a*, 72*a* in the rotational direction is reduced.

The springs 78 are elastically deformed in advance, in a condition where the first dog ring 50 (hereinafter, the first dog ring 50*a* and the first dog ring 50*c* will be simply called "first dog ring 50" when they are not distinguished) and the second dog ring 52 (hereinafter, the second dog ring 52*a* and the second dog ring 52*c* will be simply called "second dog ring 52" when they are not distinguished) are located adjacent to each other. With this arrangement, a pre-load Fpre as bias force that draws the first dog ring 50 and the second dog ring 52 toward each other can be generated even in the condition where these dog rings 50, 52 are located adjacent to each other. The width or range of adjustment of the bias force F can be expanded by adjusting the pre-load Fpre.

The second engaging teeth 68*c* are located ahead of the third engaging teeth 72*c* that protrude from the second dog ring 52*c* adjacent to the first-speed gear 30*f*, toward the first-speed gear 30*f*, as viewed in the rotational direction during forward traveling. Therefore, during driving, the meshing teeth 70*f* are brought into meshing engagement with the third engaging teeth 72*c*. Accordingly, even if the first dog ring 50*c* moves away from the first-speed gear 30*f*, meshing engagement between the third engaging teeth 72*c* provided on the second dog ring 52*c* and the meshing teeth 70*f* is maintained.

Next, a second embodiment of the disclosure will be described. In the following description, the same reference numerals are assigned to portions or components that are common to the above embodiment and this embodiment, and these portions or components will not be further described.

Figure 13:
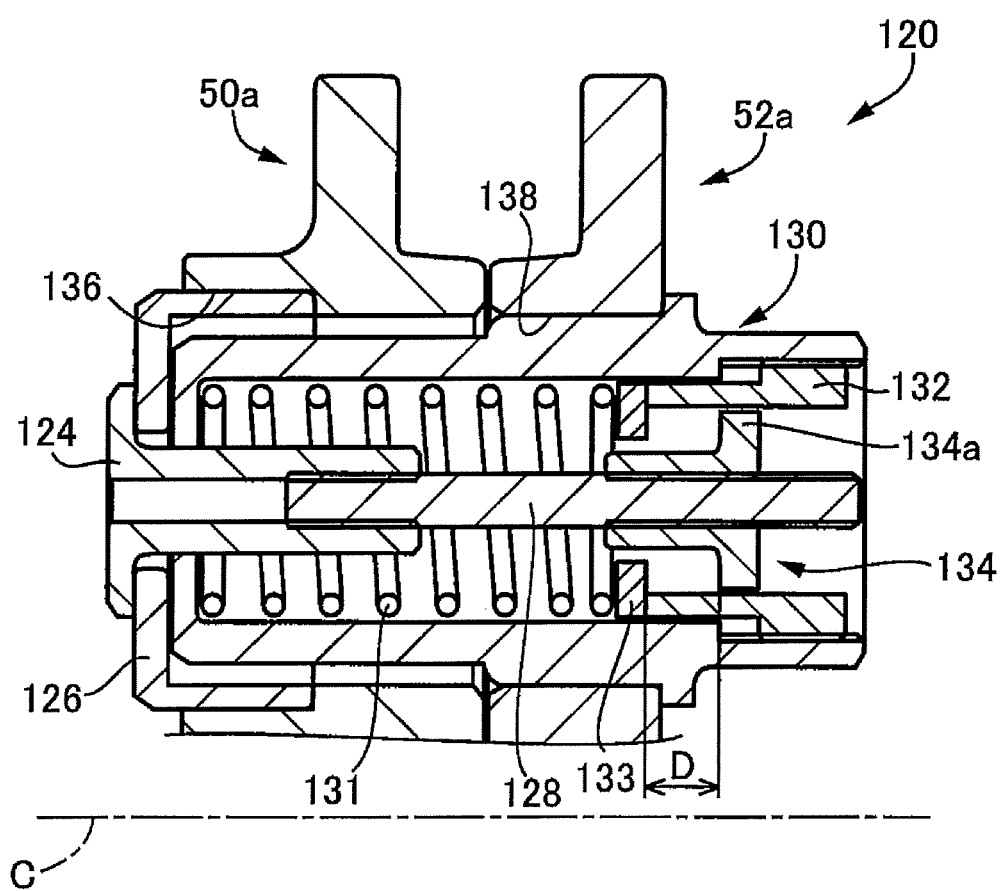
FIG. 13 is a cross-sectional view of a coupling mechanism that couples a first dog ring with a second dog ring, in a vehicular transmission as a second embodiment of the disclosure.

FIG. 13, which corresponds to FIG. 5 and FIG. 7 of the first embodiment, is a cross-sectional view of a coupling mechanism 120 that operatively couples the first dog ring 50*a* and the second dog ring 52*a*, as the second embodiment of the disclosure. In the coupling mechanism 120 of the second embodiment, an intermediate member 132 and a spring retaining member 133, which will be described later, are added. The structure of the coupling mechanism 120 will be described.

The coupling mechanism 120 includes a first engaging member 124, cover member 126, connecting pin 128, cylindrical member 130, spring 131, intermediate member 132, spring retaining member 133, and a second engaging member 134. The cover member 126 is provided in a cylindrical shape with a bottom, and its outer circumferential surface is fitted in a through-hole 136 that is provided in the first dog ring 50*a* and extends through the ring 50*a* in the direction of the axis C. The cylindrical member 130 is provided in a cylindrical shape with a bottom, and its outer circumferential surface is fitted in a through-hole 138 that is provided in the second dog ring 52*a* and extends through the ring 52*a* in the direction of the axis C. The cylindrical member 130 is fitted in position such that its one end portion with the bottom is received in the through-hole 136 of the first dog ring 50*a*.

The first engaging member 124 extends through the center of a bottom portion of the cover member 126, and one end portion of the member 124 in the direction of the axis C abuts on the bottom portion of the cover member 126, so that the cover member 126 is inhibited from moving toward the second dog ring 52*a* in the direction of the axis C. The other end portion of the first engaging member 124 in the direction of the axis C is screwed to one end of the connecting pin 128. Thus, the first engaging member 124 is screwed to one end portion of the connecting pin 128 in the direction of the axis C, and the second engaging member 134 is screwed to the other end portion of the connecting pin 128 in the direction of the axis C. Accordingly, the distance between the first engaging member 124 and the second engaging member 134 as measured in the direction of the axis C is constant.

The intermediate member 132 is screwed to an opening-side inner circumferential surface of the cylindrical member 130. The intermediate member 132 is provided in a cylindrical shape, and its one end portion in the direction of the axis C is screwed to the opening-side inner circumferential surface of the cylindrical member 130. Also, the other end portion of the intermediate member 132 in the direction of the axis C abuts on the spring retaining member 133 in the form of a circular disc. The spring retaining member 133 in the form of a circular disc is sandwiched between the spring 131 and the intermediate member 132 in the direction of the axis C.

A hole is provided on the radially inner side of the spring retaining member 133, and the second engaging member 134 and the connecting pin 128 extend through the hole. The second engaging member 134 is provided with a flange portion 134a that extends radially outward from its one end portion in the direction of the axis C, and an outer peripheral portion of the flange portion 134a is slidably fitted in the inner circumferential surface of the intermediate member 132. Thus, the second engaging member 134 is allowed to move relative to the intermediate member 132 in the direction of the axis C.

The spring 131 is inserted and interposed between the bottom portion of the cylindrical member 130 and the spring retaining member 133. The operation and effect of the coupling mechanism 120 constructed as described above will be described. In the coupling mechanism 120 of the second embodiment, the position (mounting position) at which the intermediate member 132 is screwed to the cylindrical member 130 is adjusted, so that the spring 131 can be placed in a pre-compressed state, in a condition where the first dog ring 50a and the second dog ring 52a are in abutting contact with each other. More specifically, in FIG. 13, the spring 131 is compressed, by moving the mounting position of the intermediate member 132 toward the first engaging member 124 in the direction of the axis C. Thus, the pre-load Fpre can be adjusted as appropriate, by adjusting the mounting position of the intermediate member 132.

Also, in the coupling mechanism 120, it is possible to set a dead zone in which the bias force F is zero within a range of the stroke amount S from zero to a predetermined value D. More specifically, a gap D is provided between the spring retaining member 133 and the flange portion 134a of the second engaging member 134 in the direction of the axis C. The value of the gap D corresponds to the dead zone of the stroke amount S in which the bias force F is zero. Namely, the gap D corresponds to the predetermined value D as the upper limit of the dead zone.

The operation of the coupling mechanism 120 will be described. In FIG. 13, when the second dog ring 52a moves away from the first dog ring 50a in the direction of the axis C, the cylindrical member 130 and the intermediate member 132 screwed to the cylindrical member 130 also move away from the first dog ring 50a. At this time, the spring 131 and the spring retaining member 133 are also moved as a unit with the cylindrical member 130 and the intermediate member 132, so that the spring 131 is kept in the initial compressed state (including a non-compressed state).

Then, if the second dog ring 52a moves away from the first dog ring 50a by the gap D, the spring retaining member 133 abuts on the flange portion 134a of the second engaging member 134. If the second dog ring 52a further moves, the spring retaining member 133 and the intermediate member 132 cease to contact with each other, and the spring 131 is compressed by and between the bottom portion of the cylindrical member 130 and the spring retaining member 133 (and the flange portion 134a). As a result, the spring 131 is compressed (or further compressed), so as to increase the bias force F.

Figure 14:
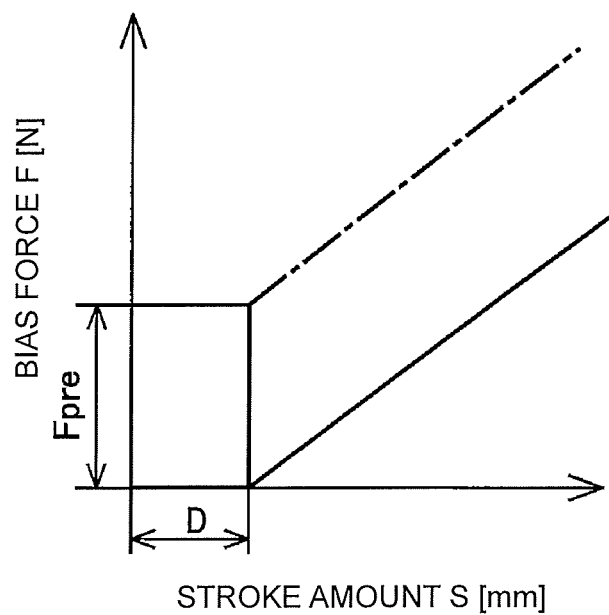
FIG. 14 is a view showing the relationship between the stroke amount and the bias force, which is obtained by the coupling mechanism of FIG. 13.

FIG. 14 shows the relationship between the stroke amount S and the bias force F, which is obtained in the coupling mechanism 120. As shown in FIG. 14, when the stroke amount S is between zero and D, the bias force F is zero, as indicated by the solid line. Once the stroke amount S exceeds the predetermined value D, the spring 131 is compressed, and the bias force F increases. It is also possible to generate a pre-load Fpre as indicated by the one-dot chain line in FIG. 14, by adjusting the mounting positon of the intermediate member 132, so that the spring 131 is placed in advance in the compressed state.

As described above, according to the second embodiment, too, substantially the same effect as that of the first embodiment can be obtained. Also, in the second embodiment, the range of the stroke amount S from zero to the predetermined value D can be set as the dead zone in which the bias force F is zero, and the range of adjustment between the stroke amount S and the bias force F can be further expanded.

While the first and second embodiments have been described in detail based on the drawings, this disclosure may be applied in other forms.

While the changeover mechanisms 28 are provided on the output shaft 22 in the above embodiments, the changeover mechanisms 28 may be provided on the countershaft 20. In another example, the changeover mechanisms 28 may be provided on the countershaft 20 and the output shaft 22, respectively.

In the above embodiments, the coupling mechanism 80, 120 is constructed such that the spring 78, 131 is compressed when the first dog ring 50 and the second dog ring 52 move relatively away from each other in the direction of the axis C. However, the coupling mechanism may be configured such that the spring is pulled or expanded when the first dog ring 50 and the second dog ring 52 move relatively away from each other. Namely, the structure of the coupling mechanism is not particularly limited provided that the bias force F is generated in such a direction as to draw the first dog ring 50 and the second dog ring 52 toward each other.

While a plurality of (e.g., nine to twelve) coupling mechanisms 80 arranged in the circumferential direction are provided in the first embodiment as described above, the characteristics of springs that constitute the respective coupling mechanisms 80 may be different from each other. For example, three types of springs having different characteristics may be used, and different springs may be cyclically located, such that the same spring is used for every third coupling mechanism in the circumferential direction. Also, the coupling mechanisms 80 and the coupling mechanisms 120 of the first and second embodiments may be used in combination. By using a combination of the coupling mechanisms 80 in which the dead zone is not set, and the coupling mechanisms 120 in which the dead zone is set, it is possible to further expand the range of adjustment of the bias force F relative to the stroke amount S.

While the clutch 16 is provided between the crankshaft 24 and the input shaft 18 in the first and second embodiments as described above, a torque converter may be provided between the crankshaft 24 and the input shaft 18.

While the engaging teeth that mesh with the meshing teeth 70 are provided on both of the first dog ring 50 and the second dog ring 52 in the first and second embodiments, the engaging teeth may be provided on one of the first dog ring 50 and the second dog ring 52. In the first and second embodiments, the first dog ring 50 is provided with the second engaging teeth 68 (the second engaging teeth 68a and the second engaging teeth 68c will be simply referred to as "second engaging teeth 68" when they are not distinguished) which pass through the through-holes 75 of the second dog ring 52, and the second dog ring 52 is provided with the fourth engaging teeth 76 (the fourth engaging teeth 76a and the fourth engaging teeth 76c will be simply referred to as "fourth engaging teeth 76" when they are not distinguished) which pass through the through-holes 74 of the first dog ring 50. However, the engaging teeth that pass through the dog rings may not be provided.

It is to be understood that the above-described embodiments are mere examples, and that this disclosure may be embodied with various changes and/or improvements, based on the knowledge of those skilled in the art.

What is claimed is:

1. A vehicular transmission, comprising:
   a shaft;
   a plurality of shift gears fitted on the shaft such that the shift gears are rotatable relative to the shaft;
   a changeover mechanism located adjacent to the shift gears in an axial direction of the shaft, the changeover mechanism being configured to switch between a condition where a selected one of the shift gears and the shaft rotate as a unit and a condition where the shift gear and the shaft rotate relative to each other; and
   a shift mechanism configured to apply force to the changeover mechanism in the axial direction of the shaft, wherein
   (i) the changeover mechanism is operable to change a gear position of the vehicular transmission,
   (ii) each of the shift gears includes a plurality of meshing teeth provided on a surface of the shift gear which faces the changeover mechanism in the axial direction of the shaft such that the meshing teeth protrude from the surface,
   (iii) the changeover mechanism includes a first ring and a second ring, the first ring being fitted on the shaft such that the first ring is not rotatable relative to the shaft, and is movable relative to the shaft in the axial direction of the shaft, the second ring being fitted on the shaft such that the second ring is not rotatable relative to the shaft, and is movable relative to the shaft in the axial direction of the shaft, at least one of the first ring and the second ring including first engaging teeth that mesh with the meshing teeth of one of the shift gears, and
   (iv) the changeover mechanism further includes a plurality of springs, the springs being configured to bias the first ring and the second ring toward each other, and the springs being configured to be elastically deformed when the first ring and the second ring move away from each other in the axial direction of the shaft.

2. The vehicular transmission according to claim 1, wherein
   (i) at least one of the first ring and the second ring includes second engaging teeth that protrude toward the other ring of the first ring and the second ring,
   (ii) the second engaging teeth pass through through-holes provided in the other ring, and are arranged to be able to mesh with the meshing teeth of one of the shift gears which faces the other ring, and
   (iii) the springs are configured to be elastically deformed, when the first ring and the second ring are moved toward said one of the shift gears, and the second engaging teeth contact with the meshing teeth of the shift gear.

3. The vehicular transmission according to claim 2, wherein
   (i) the second engaging teeth are located adjacent to the first engaging teeth in a circumferential direction, and
   (ii) the second engaging teeth are located ahead of the first engaging teeth as viewed in a rotational direction during forward traveling.

4. The vehicular transmission according to claim 1, wherein
   the springs are elastically deformed in advance in a condition where the first ring and the second ring are located adjacent to each other.

5. The vehicular transmission according to claim 1, wherein
   the springs are arranged equiangularly in a circumferential direction of the first ring and the second ring.

6. The vehicular transmission according to claim 1, wherein
   the first engaging teeth that protrude from one of the first ring and the second ring which is located adjacent to the shift gear, toward the shift gear, are provided with inclined faces.

7. The vehicular transmission according to claim 1, wherein
   a magnitude of bias force of the springs is set such that meshing engagement between the first engaging teeth of one ring of the first ring and the second ring and the meshing teeth of a corresponding one of the shift gears is maintained, when the other ring moves away from the one ring, in a condition where power is transmitted between the one ring and the corresponding shift gear, with the first engaging teeth of the one ring meshing with the meshing teeth of the shift gear.

* * * * *